United States Patent
Dorris et al.

(10) Patent No.: US 12,210,615 B2
(45) Date of Patent: *Jan. 28, 2025

(54) SYSTEM ON CHIP WITH PRE-EXEMPTION INTERRUPTS FOR PARTITION EXECUTION CONTROL

(71) Applicant: NXP USA, Inc., Austin, TX (US)

(72) Inventors: Roderick Lee Dorris, Dripping Springs, TX (US); John David Round, Austin, TX (US); Michael Andrew Fischer, San Antonio, TX (US)

(73) Assignee: NXP USA, Inc., Austin, TX (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/867,572

(22) Filed: Jul. 18, 2022

(65) Prior Publication Data

US 2024/0020379 A1    Jan. 18, 2024

(51) Int. Cl.
*G06F 21/53* (2013.01)

(52) U.S. Cl.
CPC .................... *G06F 21/53* (2013.01)

(58) Field of Classification Search
CPC ........................................ G06F 21/53
See application file for complete search history.

(56) References Cited

U.S. PATENT DOCUMENTS

| | | |
|---|---|---|
| 6,496,847 B1 | 12/2002 | Bugnion et al. |
| 7,111,200 B2 | 9/2006 | Armstrong et al. |
| 7,325,221 B1 | 1/2008 | Wingard et al. |
| 8,893,267 B1 | 11/2014 | Sathe et al. |
| 9,218,489 B2 | 12/2015 | Mooring et al. |
| 9,674,196 B2 | 6/2017 | Mendel et al. |
| 9,846,663 B2 | 12/2017 | Roberston et al. |
| 9,928,094 B2 | 3/2018 | Hepkin |
| 10,061,606 B2 | 8/2018 | Mooring |
| 10,101,387 B1 | 10/2018 | Iyer et al. |
| 10,635,622 B2 | 4/2020 | Bilski et al. |
| 10,872,152 B1 * | 12/2020 | Martel .................... G06F 21/31 |

(Continued)

OTHER PUBLICATIONS

Chip Morningstar et al., Habitat Chronicles: What are Capabilities? May 7, 2017, http://habitatchronicles.com/2017/05/what-are-capabilities/.

(Continued)

*Primary Examiner* — Beemnet W Dada

(57) ABSTRACT

A method and apparatus are disclosed for a multi-processor SoC which includes an execution domain processor for running an execution domain which hosts independent software partitions by accessing, for each software partition, one or more SoC resources; a control point processor that generates control data with pre-emption vectors for controlling access to the SoC resources by identifying at least a first SoC resource that each software partition is allowed to access; and an access control circuit connected between the execution domain and the SoC resources and configured to provide, in response to the control data, a dynamic runtime isolation barrier which enables the execution domain processor to switch between software partitions in response to a pre-emption interrupt trigger by fetching partition instructions from a corresponding pre-emption interrupt vector address in memory that is associated with the pre-emption interrupt trigger.

20 Claims, 13 Drawing Sheets

(56) References Cited

U.S. PATENT DOCUMENTS

| | | |
|---|---|---|
| 10,970,231 B2 | 4/2021 | Sternberg et al. |
| 11,005,649 B2 | 5/2021 | Fortenberry et al. |
| 11,151,262 B2 | 10/2021 | Garlati |
| 11,178,113 B2 | 11/2021 | Fong et al. |
| 11,221,978 B2 | 1/2022 | Hu |
| 11,243,783 B2 | 2/2022 | Fong et al. |
| 11,265,927 B1 | 3/2022 | Chu et al. |
| 11,477,036 B2 | 10/2022 | Caceres et al. |
| 2011/0126265 A1 | 5/2011 | Fullerton |
| 2016/0283233 A1 | 9/2016 | Wilson et al. |
| 2019/0087575 A1 | 3/2019 | Sahita et al. |
| 2019/0332816 A1 | 10/2019 | Glasco et al. |
| 2019/0392156 A1 | 12/2019 | Garlati |
| 2020/0073822 A1 | 3/2020 | Wallach |
| 2020/0074094 A1 | 3/2020 | Wallach |
| 2020/0409734 A1 | 12/2020 | Sahita et al. |
| 2021/0334213 A1 | 10/2021 | Dorris |
| 2021/0365557 A1 | 11/2021 | Chokshi et al. |
| 2022/0035953 A1 | 2/2022 | Mienkina et al. |
| 2023/0222082 A1* | 7/2023 | Dastidar ............. G06F 15/7807 710/306 |
| 2023/0300075 A1* | 9/2023 | Peri ....................... H04L 47/225 370/412 |
| 2023/0315588 A1* | 10/2023 | Deivasigamani ... G06F 11/1417 714/13 |
| 2024/0152638 A1 | 5/2024 | Li et al. |
| 2024/0169099 A1 | 5/2024 | Khosravi et al. |

OTHER PUBLICATIONS

Pascal Nasahl et al., HECTOR-V: A Heterogeneous CPU Architecture for a Secure RISC-V Execution Environment, Asia CCS '21: Proceedings of the 2021 ACM Asia Conference on Computer and Communications Security, May 2021, pp. 187-199, https://doi.org/10.1145/3433210.3453112.

* cited by examiner

SYSTEM ON CHIP WITH PRE-EXEMPTION INTERRUPTS FOR PARTITION EXECUTION CONTROL

BACKGROUND OF THE INVENTION

Field of the Invention

The present invention is directed in general to the field of information handling systems. In one aspect, the present invention relates to a security architecture, design and operation of processing subsystems on a system-on-chip information handling system.

Description of the Related Art

Information handling systems are computer-based instrumentalities primarily designed to compute, classify, process, transmit, receive, retrieve, originate, switch, store, display, manifest, measure, detect, record, reproduce, handle, or utilize any form of information, intelligence or data for business, scientific, control, or other purposes. As will be appreciated, information handling systems can be implemented in integrated circuit form with any suitable configuration of one or more microprocessors or microcontrollers, but different integrated circuit configurations provide different challenges for implementing required information handling system functionality. For example, a system on a chip (SoC) is an integrated circuit configuration that integrates all or most components of a computer or other electronic system on a single integrated circuit die, substrate, or microchip. When the integrated components on an SoC include multiple processing subsystems which interact with on-chip memory and/or input/output devices, there are security-related challenges caused by malicious or erroneous program code which can cause undesired effects, security breaches or damage to the information handling system. These security challenges are amplified with SoC-based information handling systems since a malicious code that penetrates one SoC processing subsystem may be able to penetrate other SoC processing subsystems.

To eliminate, control, or contain the impact of malicious or erroneous programs, isolation techniques have been developed to prevent malware attacks from spreading between processors or partitions, to prevent inadvertent leakage of confidential information, and to contain the extent of damage due to software errors. Such isolation techniques conventionally rely on management of virtual memory space, and, ultimately, on hardware privilege levels intended to allow supervisor software to operate in a reliable and trustworthy manner. To this end, existing isolation techniques typically include one or more solutions, including (1) executing the isolation software, at least in part, on the same processor as the software being isolated with protection provided by executing the isolation program at a higher privilege level of the processor's architecture, (2) preventing different software entities from accessing each other's data using the memory management and protection facilities of the processor's architecture, and/or (3) preventing unauthorized access to memories or peripherals that occupy the same physical address space and/or are attached to shared physical interconnection infrastructure by using filtering hardware that is located between the physical interconnection infrastructure and the addressable memories or peripherals and that is responsive, at least in part, to identification of the source of the transaction, with said source identification provided by the infrastructure rather than by the software that initiates the transaction. Unfortunately, such isolation techniques have a number of inherent weaknesses. The most significant weakness is that they all depend on the integrity of the master processor's privilege mechanism since software executing at a sufficiently high privilege level can access, override, circumvent, and/or otherwise compromise the hardware security mechanisms in solutions (2) and (3). Unfortunately, there are a number of privilege-escalation attacks that can compromise privilege-based isolation schemes. For example, if a privilege-escalation attack infects or compromises the operating system or a hypervisor, all assertions regarding the isolation properties of that system, including the system's entire security model, can become invalid. There are also known attacks on some processors that corrupt memory mapping tables, allowing at least partial circumvention of the protections in solution (2)—even in the absence of privilege escalation.

In addition to privileged-based isolation techniques, there are other SoC isolation techniques which create a boot control point, such as a boot processor or other dedicated secure enclave subsystem, which is independent of the SoC CPU(s) and is designed to keep sensitive user data secure, even when the underlying CPU(s) becomes compromised. In operation, dedicated secure enclave subsystems use address space control mechanisms to provide some level of SoC control by constructing isolation barriers around the address space targets (e.g., memory, peripherals, etc.), but they do not include or protect the physical interconnection infrastructure (e.g., crossbar bus, network on a chip (NoC), etc.) or the CPU(s) which are connected on the other side of the physical interconnection infrastructure (e.g., crossbar bus, NoC, etc.). To this end, the address space control mechanisms provide bus masters with a bus master device ID so that the address space targets (memory, peripherals, etc.) are configured with an isolation barrier which is gated by access rights associated with the bus master device IDs. With such dedicated secure enclave subsystems, an invalid transaction from a CPU can be sent out on the interconnect and will be rejected at the receiving end, leaving unprotected the interconnect or other CPUs. Another disadvantage with dedicated secure enclave subsystems is that the requirement of a bus master device ID creates a finite limit on the number of CPU domains that can be supported without re-engineering the interconnect hardware. In addition, dedicated secure enclave subsystems provide a boot control point only during system boot, and do not provide dynamic runtime isolation control of the SoC.

As seen from the foregoing, existing solutions for operating and controlling SoC-based information handling systems are extremely difficult at a practical level by virtue of the challenges with providing protection and isolation of processor subsystems against malicious attacks. There are also numerous weaknesses with privilege-based isolation schemes which can be compromised by privilege-escalation attacks. There are also weaknesses with using dedicated secure enclave subsystems in terms of timeframe and scope of SoC control that can be provided. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
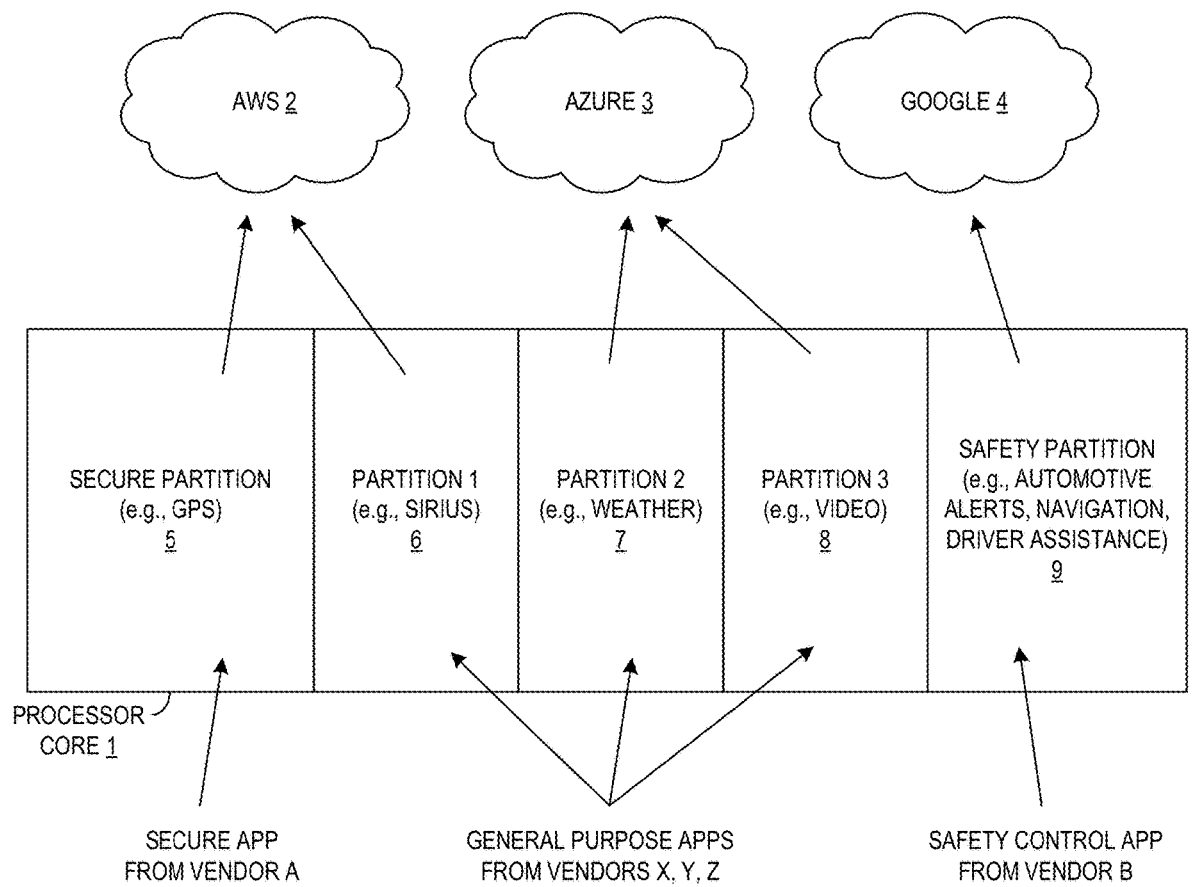
FIG. 1 is a simplified system level architecture block diagram illustrating a single processor core with multiple partitions populated with code from different vendors.

A system-on-chip (SoC) isolation architecture, design, and method of operation are described wherein an SoC control point entity constructs and maintains a dynamically programmable isolation barrier around each execution domain under control of a two-way control channel data stream, thereby providing software-configured hardware enforced mechanisms for dynamic runtime software protection, isolation, and virtualization control. The disclosed SoC control point entity may be implemented as a dedicated CPU that creates a separate two-way control channel connected between the SoC control point entity and a CPU control point for each execution domain. By programming the control channel with a control channel data stream, the SoC control point entity creates an isolation barrier that is physically and programmatically separate and independent from all of the execution domain processors on the SoC, and therefore also independent from any software, including privileged software, running on those execution domain processors. In selected embodiments, the control data includes a set of pre-emption interrupt vector addresses and a set of pre-emption interrupt triggers to create a dynamic runtime isolation barrier that specifies different pre-emption actions taken by the execution domain when switching between partitions. Each control channel may be implemented with any suitable combination of control registers, routing access circuits, and/or electrical connections (power, clock, etc.) which attach or connect the execution domain to the SoC system. For example, each control channel may include an address space controller (ASC) which defines allowed or blocked address spaces for the attached execution domain. Each control channel may also include a peripheral access controller which defines allowed or blocked peripherals for the attached execution domain. In addition or in the alternative, each control channel may include a reset control block (RCB) which establishes different reset vector addresses that may be latched for the attached execution domain, depending on the type of reset being triggered. In addition or in the alternative, each control channel may include an interrupt routing block which specifies external interrupts that are allowed to reach the attached execution domain. In operation, the SoC control point entity sends startup control data to a control channel connected to an execution domain processor to control the access and isolation of the execution domain processor at boot time. In addition, new control data may be sent at any time, allowing the control channel to dynamically reconfigure the isolation barrier during runtime. In addition, the control channel can send return data back over the control channel data stream, allowing the SoC control entity to monitor the status/health of the execution domain and to take action depending on the status of the return data.

As seen from the foregoing, there are a number of advantages to the disclosed SoC control point isolation mechanism. First, the isolation barrier protection is data-driven rather than being driven by a privilege execution mode of any execution domain processor, so the isolation barrier protection is not susceptible to privilege escalation attacks. And because the isolation control mechanism is provided as a separate data stream for each execution domain, the control data provides dynamic context-specific isolation and address virtualization control for each domain, thereby eliminating any requirement of bus master device ID bits that must be carried on bus transactions. Another advantage of providing an SoC control point that is separate from the execution domain processors is that the CPU-level facilities for the relevant CPU architecture do not need to be changed, meaning that existing software environments can be used on each CPU without modification. Most importantly, since the protection, isolation, and virtualization provided by the disclosed SoC control point isolation mechanism are not dependent on the privileged execution model of the processors on the SoC, any privileged software running on any execution domain processor cannot modify or compromise the SoC control point isolation mechanisms.

Various illustrative embodiments of the present invention will now be described in detail with reference to the accompanying figures which illustrate functional and/or logical block components and various processing steps. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected embodiments of the present invention are implemented, for the most part, with electronic components and circuits known to those skilled in the art, and as a result, circuit details have not been explained in any greater extent since such details are well known and not considered necessary to teach one skilled in the art how to make or use the present invention. In addition, selected aspects are depicted with reference to simplified circuit schematics, logic diagrams, and flow chart drawings without including every circuit detail or feature to avoid limiting or obscuring the present invention. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

For a contextual understanding of the security challenges presented with SoC-based information handling systems, reference is now made to FIG. 1 which depicts a simplified system level architecture block diagram of an information handling system wherein a single processor core 1 runs a plurality of partitioned software partitions 5-9 in memory that are populated with code from different vendors A, B, X, Y, Z which access different cloud services 2-4. In an example automotive embodiment, the processor core 1 stores a security application, such as a GPS program from Vendor A, in the secure partition 5. In addition, a general-purpose application, such as an infotainment from Vendor X or weather program from Vendor Y or video program for Vendor Z, is stored in the partitions 6-8, and an automotive safety control application, such as a navigation and driver assistance application from an automotive Vendor B, is stored in safety partition 9. Because the vendor-specific partitions 5-9 are connected to access and store data on one or more cloud-based servers (e.g., Amazon Web Services® 2, Azure® 3, or Google® 4), they are designed to be separate and independent from one another so that they do not share anything, such as programming code, security keys, intra-partition debugging access, etc. To enforce such partition separation, a hypervisor at the processor core 1 can provide certain levels of isolation between the individual partitions 5-9, but such privileged-based isolation is not sufficient to protect against malware attacks on the processor core 1 since access to one partition provides access to other partitions at the same privilege level. Similarly, isolation systems which rely on processor IDs to protect peripherals or memory areas are vulnerable to privilege escalation attacks where the processor core 1 uses the same processor ID for all peripherals or memory areas.

Figure 2:
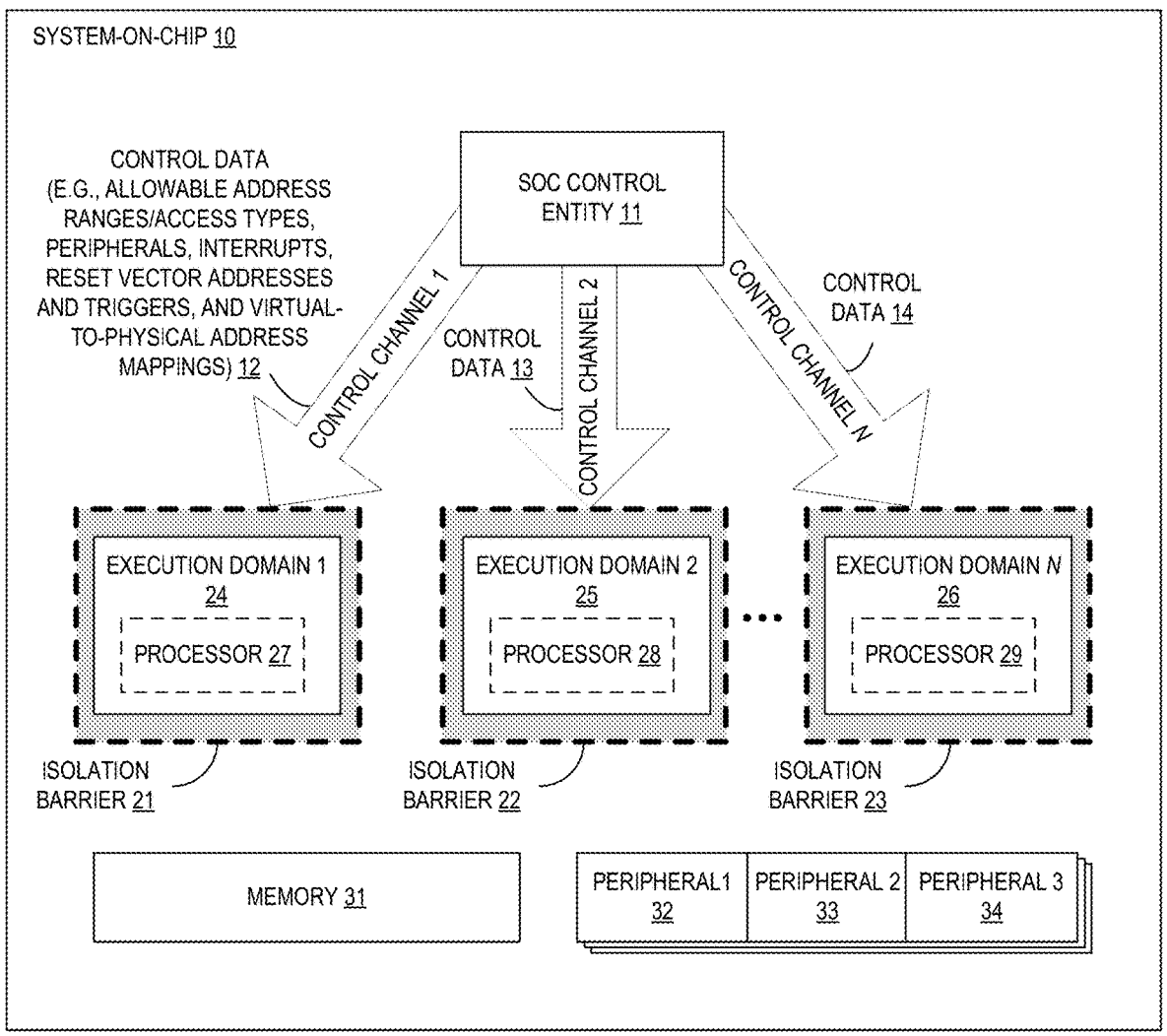
FIG. 2 is a simplified schematic block diagram of a system on a chip (SOC) system having an isolation control architecture where a dedicated SOC control entity issues control data to create a dynamic runtime isolation barrier around each execution domain in accordance with selected embodiments of the present disclosure.

For an improved understanding of selected embodiments of the present disclosure, reference is now made to FIG. 2 which depicts a simplified schematic block diagram of an SOC system 10 which includes one or more execution domains 24-26, a system memory 31, and a set of peripherals 32-34. Each of the execution domains 24-26 is characterized by a single processor 27-29 (e.g., CPU, DSP, GPU, etc.) or a cluster of homogeneous processors. In this context, "homogeneous processors" refers to processors using the same instruction set architecture (ISA), and a "cluster of homogeneous processors" refers to an interconnected group of homogeneous processors where one operating environment (e.g., linux) may control the entire group such that from the outside it appears to be one multi-threaded processor. These processors may be of any architecture (ARM, RISC-V, PPC, etc.), and may be mixed on a given SoC implementation. The depicted SoC system 10 also includes a dedicated SOC control entity 11 which is physically and programmatically independent from all of the execution domain processors 27-29 on the SoC 10, and independent from any software, including privileged software, running on those execution processors 27-29. In selected embodiments, the SoC control entity 11 is a CPU running a system control program which implements an isolation control architecture by issuing control data 12-14 to control channels which create dynamic runtime isolation barriers 21-23 around corresponding execution domains 24-26. As will be appreciated, the dedicated SOC control entity 11 may be connected and configured to communicate over a private and/or public crossbar switch or bus interconnect to the plurality of control channels 1-N corresponding to the "N" execution domain processors 27-29.

On the SOC system 10, the independent SoC runtime control entity 11 is the first programmable element which executes during system boot to establish separate data stream connections 12-14 which configure the isolation barriers 21-23 around each of the execution processors/domains 24-26. As described hereinbelow, each data stream 12-14 defines the context in which the corresponding execution domain 24-26 is allowed to execute in relation to accessing the system memory 31 and peripherals 32-34 or otherwise respond to system interrupts and resets. For example, the control data (e.g., 12) from the SoC control entity 11 to the execution domain (e.g., 24) may include data specifying allowable address ranges, access type for each of those address ranges, peripherals which the execution domain can access, interrupts which are allowed to enter the domain, reset vector addresses and triggers, pre-emption interrupt triggers and associated pre-emption vector addresses, and/or virtual-to-physical address mappings. By using separate control channel data streams 12-14 to configure the isolation barriers 21-23 around each execution domain 24-26, the SoC control entity 11 is not required to isolate the execution domains by using processor device IDs that must be carried on bus transactions. As a result, the isolation control architecture provided by the SoC runtime control entity 11 is scalable to protect an unlimited number of execution domains since there is no requirement of adding more bus transaction bits for device IDs, no matter how many execution domains are added.

At startup, the SoC control point entity 11 sends control data 12-14 over different control channels 1-3 that are connected, respectively, to N execution domains 24-26 to control the ability of the execution domain processor 27-29 to access various system resources. In addition, the SoC control point entity 11 may send new control data over the control channels 1-3 at any time, allowing the isolation barriers 21-23 to be dynamically reconfigured during runtime. In this way, the SoC control point entity 11 creates a dynamic runtime isolation barrier 21-23 around each execution domain 24-26.

Figure 3:
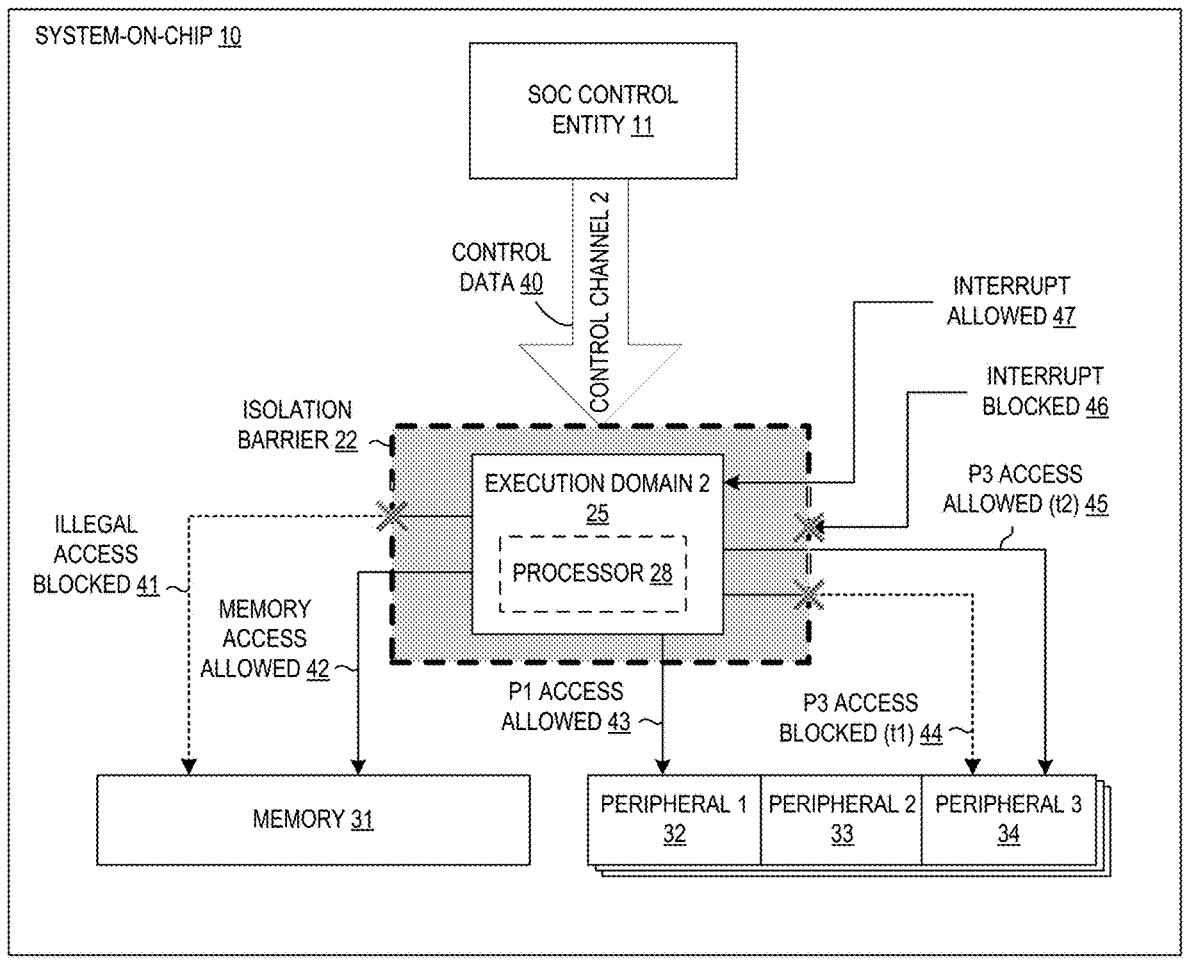
FIG. 3 is a simplified schematic block diagram of the SOC isolation control system architecture to illustrate how the SoC control entity generates control data over a control channel to create a dynamic runtime isolation barrier that specifies access and isolation constraints for actions performed by the execution domain in accordance with selected embodiments of the present disclosure.

For an improved understanding of selected embodiments of the present disclosure, reference is now made to FIG. 3 which depicts a simplified schematic block diagram of the SOC system 10 shown in FIG. 2 to illustrate how the SoC control entity 11 generates control data 40 over a control channel 2 to create a dynamic runtime isolation barrier 22 that specifies access and isolation constraints for actions performed by the execution domain in relation to the memory 31 and peripherals 32-34. In selected embodiments, the control data 40 may specify that the isolation barrier 22 allow memory accesses to defined address space ranges and allowed access types (Read/Write/Execute) on each of those ranges. As a result, if a memory access request from the execution domain processor 28 is outside of the defined address space range, then the isolation barrier 22 blocks the illegal memory access request 41. However, if a memory access request from the execution domain processor 28 is within the defined address space range, then the isolation barrier 22 allows the memory access request 42.

In similar fashion, the control data 40 may specify that the isolation barrier 22 allow or block access requests to defined peripherals from the execution domain processor 28. For example, if a peripheral access request from the execution domain processor 28 is to an approved peripheral 32 (e.g., Peripheral 1), then the isolation barrier 22 allows the peripheral access request 43. However, if a peripheral access request from the execution domain processor 28 is to a blocked peripheral 34 (e.g., Peripheral 3), then the isolation barrier 22 blocks the peripheral access request 44. The control data 40 may also specify that the isolation barrier 22 allow or block defined interrupts sent to the execution domain processor 28. For example, the control data 40 may specify that the isolation barrier 22 block an interrupt request 46 to the execution domain processor 28 that is identified as an unpermitted interrupt. However, if an interrupt is identified by the control data 40 as a permitted interrupt request 47, then the isolation barrier 22 allows the interrupt request 47 to be delivered to the execution domain processor 28.

As will be appreciated, the control data 40 provided by the SoC control entity 11 enables the isolation barrier 22 to be programmed for isolation control of the execution domain by allowing or blocking actions that can be performed by the execution domain processor 28. Examples of actions that can be allowed or blocked by the control data 40 include, memory or peripheral access requests by the execution domain processor 28, interrupt requests the execution domain processor 28, reset vector actions by the execution domain processor 28, or any suitable access request to or from the execution domain processor 28.

It will also be appreciated, that the control data 40 may be sent at any time, and not just during boot up. For example, at time t1, the SoC control entity 11 may send control data which specifies that the isolation barrier 22 block a peripheral access request 46 to Peripheral 3 34, as indicated by P3 Access blocked (t1) 44. However, at a subsequent time t2, the control data 40 may be sent by the SoC control entity 11 which specifies that the isolation barrier 22 allow a peripheral access request 47 to Peripheral 3 34, as indicated by P3 Access allowed (t2) In this way, the SoC control entity 11 can dynamically reconfigure the isolation barrier 22 during runtime.

Figure 4:
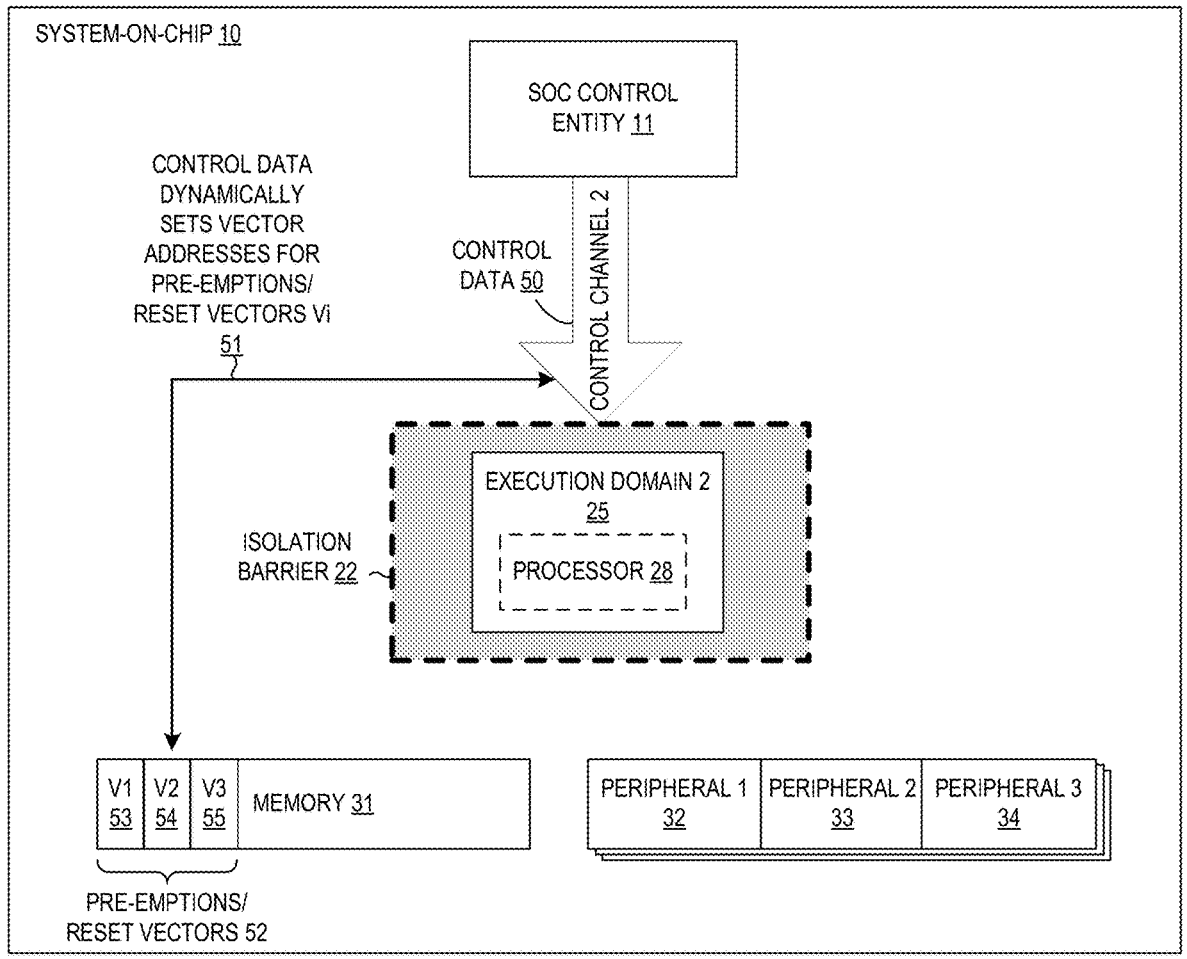
FIG. 4 is a simplified schematic block diagram of the SOC isolation control system architecture to illustrate how the SoC control entity generates control data over a control channel to create a dynamic runtime isolation barrier that specifies different reset actions taken by the execution domain by providing multiple programmable reset vector addresses in accordance with selected embodiments of the present disclosure.

For an improved understanding of selected embodiments of the present disclosure, reference is now made to FIG. 4 which depicts a simplified schematic block diagram of the SOC system 10 shown in FIG. 2 to illustrate how the SoC control entity 11 generates control data 50 over a control channel 2 to create a dynamic runtime isolation barrier 22 that specifies different reset actions that can be taken by each execution domain (e.g., execution domain 25) in response to different vectors V1. In selected embodiments, the control data 50 may dynamically set or specify vector addresses 51 for different reset vectors or pre-emption vectors 52 stored in memory 31 that may be latched, depending on the type of reset or pre-emption being triggered. For example, the control data 50 may specify that a first type of reset is latched to a first vector address V1 53 in memory 31 where one or more reset instructions are stored for processing the first type of reset. In addition, the control data 50 may specify that a second type of reset is latched to a second vector address V2 54 in memory 31 where one or more reset instructions are stored for processing the second type of reset. Likewise, the control data 50 may specify that a third type of reset is latched to a third vector address V3 55 in memory 31 where one or more reset instructions are stored for processing the third type of reset.

As disclosed herein, the control data 50 may configure the isolation barrier 22 to direct any number of reset types to different reset vector addresses 52 in memory 31. In selected embodiments, the SoC control entity 11 sends reset control data 50 by loading a vector address 52 corresponding to a predetermined reset type into a control channel 2 control register. At some later time, the predetermined reset type is activated/triggered by the SoC control entity 11 by setting a bit in a control channel 2 control register, where the bit corresponds to the aforementioned predetermined reset type, and this activation causes the execution domain processor to immediately start fetching instructions from the corresponding reset vector address 52 in memory 31. And since the SoC control entity 11 is able to dynamically set the control data at any time to latch an individual execution domain 25 to a different reset vector address based on the type of reset triggered, the SoC control entity 11 can reset an execution domain that is hung, or can reset an execution domain for a safety and/or security violation. In this way, the reset performance of the execution domain 25 may be dynamically configured under software control by the SoC control entity 11 to provide flexible, runtime resets for an individual domain, in contrast to conventional hardware-based reset systems which provide a fixed reset solution to the entire SoC system so that all execution domains are reset together.

Figure 5:
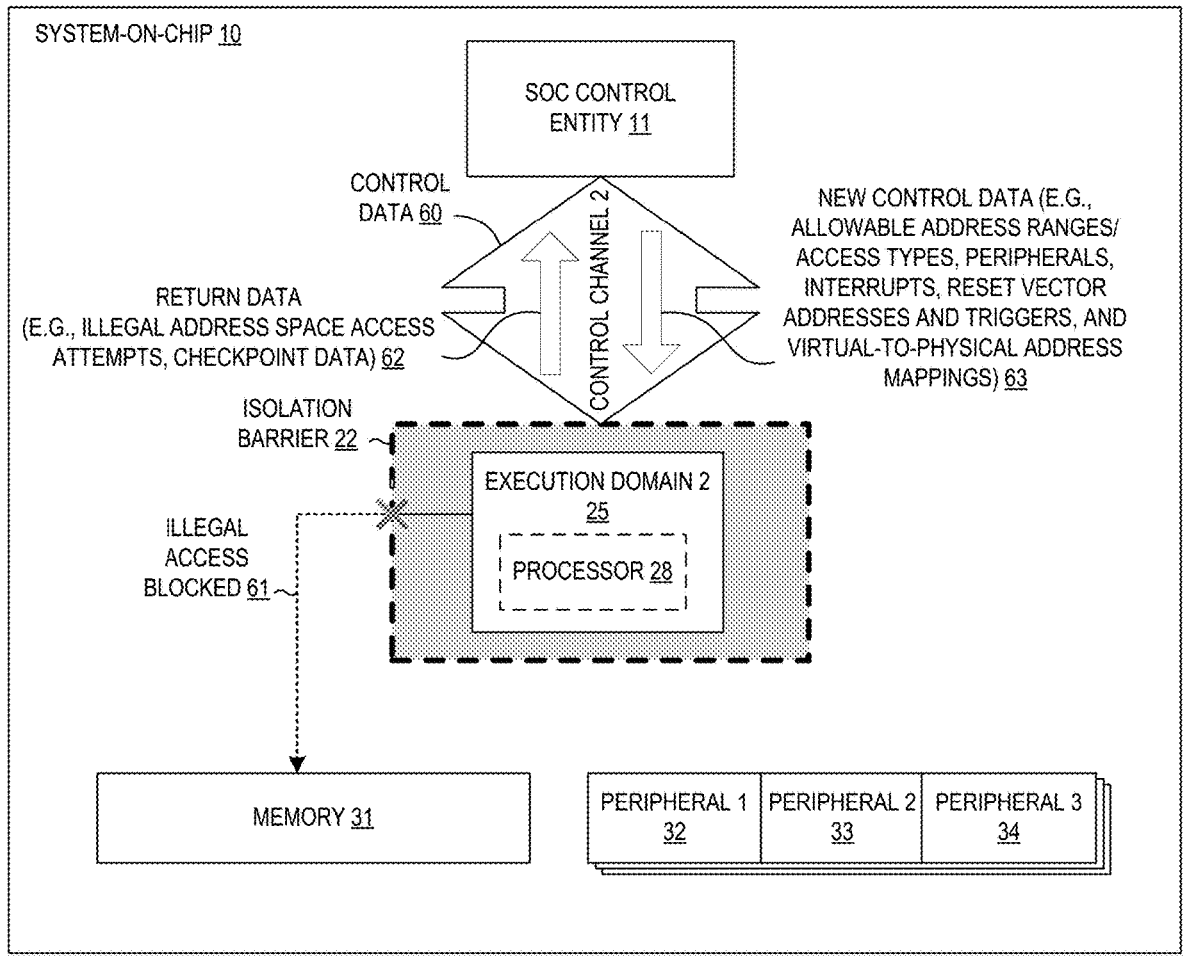
FIG. 5 is a simplified schematic block diagram of the SOC isolation control system architecture to illustrate how the SoC control entity generates new control data in response to monitored actions by the execution domain to create a dynamic runtime isolation barrier in accordance with selected embodiments of the present disclosure.

For an improved understanding of selected embodiments of the present disclosure, reference is now made to FIG. 5 which depicts a simplified schematic block diagram of the SOC system 10 shown in FIG. 2 to illustrate how the SoC control entity 11 generates control data 60 over a control channel 2 to create a dynamic runtime isolation barrier 22 by generating new control data 63 in response to monitored actions by the control channel 2. As depicted, the control data 60 is a 2-way control data stream that includes return data 62 that is sent to the SoC control entity 11 by the control channel 2 in response to monitored events being detected by the control channel 2. In selected embodiments, the return data 62 from the control channel (e.g., 2) to the SoC control entity 11 may include illegal address space access attempts, and may also optionally include checkpoint data so that the health of the execution domain 25 can be monitored. In addition, the 2-way control data stream 60 includes new control data 63 that is generated by the SoC control entity 11 and sent to the control channel 2 to update the runtime control of the execution domain 25. For example, the new control data 63 from the SoC control entity 11 to the control channel (e.g., 2) may include data specifying allowable address ranges, access type for each of those address ranges, peripherals which the execution domain can access, interrupts which are allowed to enter the domain, reset vector addresses and triggers, pre-emption interrupt triggers and associated pre-emption vector addresses, and/or virtual-to-physical address mappings. With the 2-way control data stream 60 providing an opportunity to feedback information to the SoC control entity 11, check points can be established at the control channel 2 so that the SoC control entity 11 can monitor the health or performance of the execution domain 25. For example, if an illegal memory access 61 attempts to access memory 31 outside of an allowed address range, the control channel 2 may be configured to send a return data message 62 to the SoC control entity 11 identifying the illegal memory access attempt. In response, the SoC control entity 11 may send new control data 63 which configures the control channel 2 and/or execution domain processor 28 to take corrective action, such as reloading the execution domain software, resetting the execution domain, or taking the execution domain offline.

As seen from the foregoing, there are numerous benefits of implementing the isolation control architecture with a separate and programmable SoC control entity that dynamically programs the control channel to create an isolation barrier around each execution domain. First, the disclosed isolation control architecture allows different execution domains in the SoC system to be isolated from one another with dynamically reconfigurable isolation barriers to suit changing system needs at startup and during runtime. In addition, the isolation performance is not dependent on the privileged execution modes of any of the execution domain processors. Instead, execution domain access to system resources is dynamically configured by a control entity that is outside of the scope of any execution domain processor/CPU control point or any privileged software running on said execution domain processor/CPU control point. As a result, even if the highest privilege level in the execution domain is compromised, the runtime system control is not compromised. In addition, the disclosed isolation control architecture uses a data-driven control mechanism that is completely agnostic to any underlying processor architecture (ARM, RISC-V, PPC, etc.) in the execution domains, and can support processors of any type (CPU, DSP, GPU, etc.) without changes to the control software. The disclosed isolation control architecture also provides a control data feedback capability so that return data sent back from the control channels to the runtime control entity can be used to make fine-grained changes to the system configuration.

Figure 6:
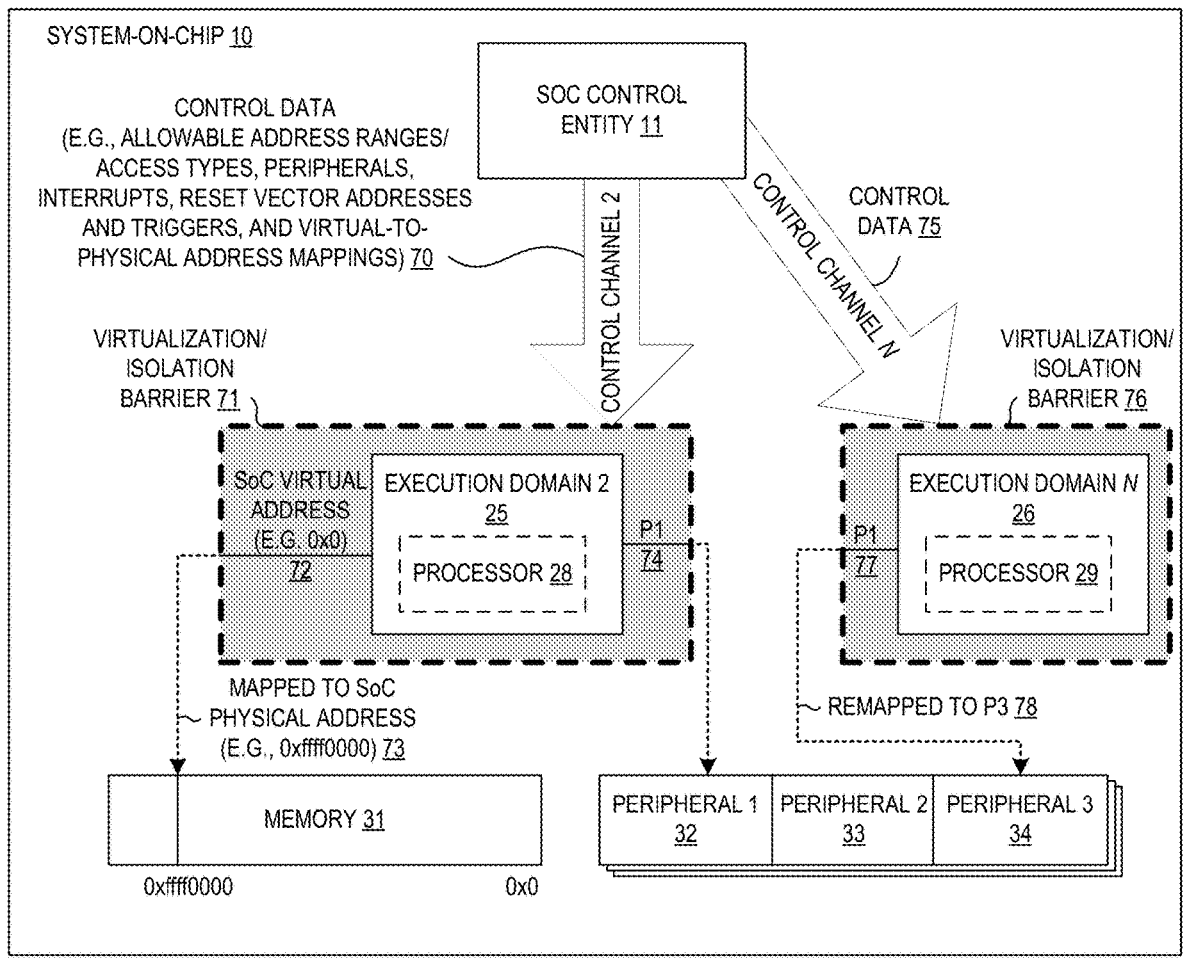
FIG. 6 is a simplified schematic block diagram of the SOC isolation control system architecture to illustrate how the SOC control entity generates control data with virtual-to-physical address mappings to create a dynamic runtime virtualization isolation barrier around each execution domain in accordance with selected embodiments of the present disclosure.

For an improved understanding of selected embodiments of the present disclosure, reference is now made to FIG. 6 which depicts a simplified schematic block diagram of the SOC system 10 shown in FIG. 2 to illustrate how the SoC control entity 11 generates control data 70 over a control channel 2 that includes virtual-to-physical address mappings to create a dynamic runtime virtualization isolation barrier 71 that specifies access and isolation constraints for actions performed by the execution domain 25 in relation to the memory 31 and peripherals 32-34. In selected embodiments, the control data 70 may specify that the virtualization isolation barrier 71 allow the associated execution domain 25 to process only specified or approved interrupt requests and/or reset requests associated with defined reset triggers. In addition, the control data 70 may specify that the virtualization isolation barrier 71 allow only memory accesses to defined SoC virtual address space ranges and allowed access types (Read/Write/Execute) on each of those ranges. In addition, the control data 70 may specify virtual-to-physical address mapping data so that the virtualization isolation barrier 71 can translate or map the defined SoC virtual address space ranges into SoC physical address space ranges. As a result, if a memory access request 72 from the execution domain processor 28 is outside of the defined SoC virtual address space range, then the virtualization isolation barrier 71 blocks the illegal memory access request 72. However, if a memory access request 72 (e.g., 0x0) from the execution domain processor 28 is within the allowed SoC virtual address space range, then the virtualization isolation barrier 71 uses the virtual-to-physical address mapping data to transform the memory access request 72 into a SoC physical address 73 (e.g., 0xffff0000) before allowing the memory access request 73 to proceed to memory 31.

In similar fashion, the control data 70 may specify that the virtualization isolation barrier 71 for an execution domain 25 allow or block access requests to defined peripherals from the execution domain processor 28. For example, if a peripheral access request 74 from the execution domain processor 28 is to an approved peripheral 32 (e.g., Peripheral 1), then the virtualization isolation barrier 71 uses the virtual-to-physical address mapping data to allow the peripheral access request 74 to access the approved peripheral 32. However, if a peripheral access request from the execution domain processor 28 is to a blocked peripheral 34 (e.g., Peripheral 3), then the virtualization isolation barrier 71 blocks the peripheral access request.

In allowing peripheral access requests, it will be appreciated that the virtualization isolation barrier 71 may use the virtual-to-physical address mapping data to remap virtual address space contentions for SoC resources at the SoC level. For example, if two execution domains (e.g., 25, 26) have issued approved peripheral requests 74, 77 to virtual addresses for the same peripheral device (e.g., Peripheral 1), the virtualization isolation barrier 71 for the first execution domain 25 may use its virtual-to-physical address mapping data to allow the peripheral access request 74 to access the approved peripheral 32, while the virtualization isolation barrier 76 for the second execution domain 26 may use its virtual-to-physical address mapping data to remap the peripheral access request 77 to access the approved peripheral 34.

As disclosed herein, the control data 70 provided to configure the virtualization isolation barrier 71 enables an address space virtualization at the SoC level that is "outboard" of any memory management unit (MMU) in the execution domains 25, 26. In particular, even if the execution domain 25 has an MMU, the address coming out of the MMU is an SoC virtual address 72 that is mapped to an SoC physical address 73 by the virtualization isolation barrier 71. This allows for virtualization of memory-mapped peripherals at the SoC level. This SoC-level virtualization is outside of the scope of any privileged software running in any execution domain.

It will also be appreciated, that the control data 70 may be sent at any time to configure the virtualization isolation barrier 71, thereby dynamically virtualizing the approved memory address ranges and peripherals across the entire SoC with a potential mix of execution domain types and differing processor/CPU architectures, independent of any software running at any privilege level within the execution domains 25-26. Since the virtualization isolation barrier 71 may be configured to virtualize the address ranges and peripherals at the SoC level without the knowledge of the execution domains 24-26, there is no requirement for virtualization hardware or software in the execution domain. And because virtualization is outside of the scope of the execution domain, the software running in the execution domain(s) does not need to be specifically designed or built for a virtual environment, thereby simplifying the execution domain software. The use of control data 70 to configure the virtualization isolation barrier 71 also eliminates any requirement for running a software agent or hypervisor in the execution domain. Another advantage of using separate control data streams (e.g., 70, 75) to separately configure the virtualization isolation barriers 71, 76 at the SoC level is that virtualization can be established across multiple execution domains, even if they are of differing underlying processor type or architecture For an improved understanding of selected embodiments of the present disclosure, reference is now made to FIG. 7 which depicts a simplified block diagram of an access control channel 81 having a programmable front end 82 and a signals-based back end 83. Connected between the SoC control entity 11 and execution domain 86, the access control channel 81 is connected to exchange control data 80 with the SoC control entity 11. In particular, control data 80 that is received from the SoC control entity 11 may be used to configure a separate access control channel (e.g., 81) for each execution domain (e.g., 86), thereby creating a dynamic runtime isolation barrier for each execution domain that provides enforceable mechanisms for runtime protection, isolation, virtualization, and execution control (context-switching). And by providing a separate access control channel 81 for each execution domain, the SoC system can host up to n independent software execution environments (partitions) wherein the isolation, virtualization, and context-switching between these environments is handled via the runtime control data stream 80 from the SoC control entity 11.

In the access control channel 81, the programmable front end 82 is connected to receive the control data 80 that enters the data stream, and the back end 83 is the end point of the data stream where all of the signals are connected to the execution domain 86 under control of the control data stream 80. In between the front end 82 and back end 83 are the various hardware and software mechanisms 84-85 needed to interpret the control data 80 and implement control of the relevant signals to and from the execution domain 86.

The programmable front end 82 is only accessible by the SoC control entity 11 and may be implemented with a common, standardized, or uniform programmable interface 84 that is the same for all types and architectures of execution domain processors. In selected embodiments, the common programmable interface 84 will be memory-mapped over a private address space so that it will only be accessible by the SoC control entity 11. In other embodiments, the common programmable interface 84 will be memory-mapped over a public address space or other suitable interconnect. One of the advantages of using a uniform input interface 84 is that the SoC control entity 11 can control one or more execution domains without any knowledge of the underlying processor or CPU structure 87. This means that the software running on the SoC control entity can be much simpler (by virtue of communicating with a standard programmable interface 84) and still support any processor type or architecture at the execution domain without knowledge of that processor (by virtue of the functional customization provided by the hardware and software mechanisms 85). The uniform input interface 84 also allows any number of access control channels to be added to an SoC system design without requiring any hardware redesign.

The back end 83 of the access control channel 81 may include multiple hardware and software mechanisms 85 that are connected to the common programmable interface 84 to provide the hardware and software connection between the execution domain 86 and the rest of the SoC system, While the programmable front end interface 84 remains the same for all processor types and architectures, the back end control circuitry 85 will be specific to the processor architecture 87 of the connected execution domain 86. For example, the back end 83 may include an interrupt routing control block 85A which is programmed by the control data 80 which assigns one or more "allowed interrupts" to the execution domain 86 so that the interrupt routing block 85A determines if an interrupt request to the execution domain CPU 87 is an "allowed" interrupt before forwarding any "allowed" interrupts to the execution domain 86. In addition, the back end 83 may include a reset control block 85B which is programmed by the control data 80 to establish one or more reset vector addresses in memory for different types of allowed resets so that the reset control block 85B determines if a received reset request is a reset type that is "allowed" for the execution domain 86 before setting a reset line to the execution domain 86. The back end 83 may also include a JTAG debug control unit 85C which is programmed by the control data 80 with jtag debug control data to selectively enable or disable the scan chain control signal going into the CPU 87 on a per-partition basis, thereby providing dynamic partition-based jtag debug control for isolating software partitions across jtag debug operations. In addition, the back end 83 may include a preemption control block 85D which is programmed by the control data 80 to establish one or more pre-emption vector addresses in memory for different types of allowed pre-emption interrupt triggers so that the preemption control block 85D determines if a received pre-emption interrupt request is "allowed" for the execution domain 86 before setting a pre-emption event line to the execution domain 86. The back end 83 may also include a power management block 85E which is programmed by the control data 80 to switch power modes in the execution domain 86 in response to a low-power request. In addition, the back end 83 may include a messaging interface block 85F which is programmed by the control data 80 to provide a service interface which allows the execution domain CPU 87 to request services from the SoC control entity 11. The back end 83 may also include an address space control and mapping block 85G which is programmed by the control data 80 to assign address locations for "allowed" memory and/or peripherals for the execution domain 86 so that the address space control and mapping block 85G determines if an access request 88 by the execution domain CPU 87 is "allowed" before forwarding any "allowed" access requests 89 to the memory or peripheral. In embodiments where virtualization of the isolation barrier is supported, the address space control and mapping block 85G may be programmed with virtual-to-physical address mappings which are used to map or translate an SoC virtual address for an access request 88 into an SoC physical address for an "allowed" memory and/or peripherals access request 89, thereby creating a dynamic runtime virtualization isolation barrier around each execution domain.

By providing the access control channel between the SoC control entity 11 and each execution domain, isolation of the different execution domains can be achieved without requiring deviceIDs or streamIDs either internally or externally, to communicate over the system crossbar or interconnect switch. As a result, any number of access control channels may be attached to the SoC control entity 11 without requiring further hardware redesign of the system crossbar or interconnect switch. This means that there is no limitation on the number of execution domains that may be supported by a given SoC design, making it simple to define device families with differing numbers of execution domains.

Figure 8:
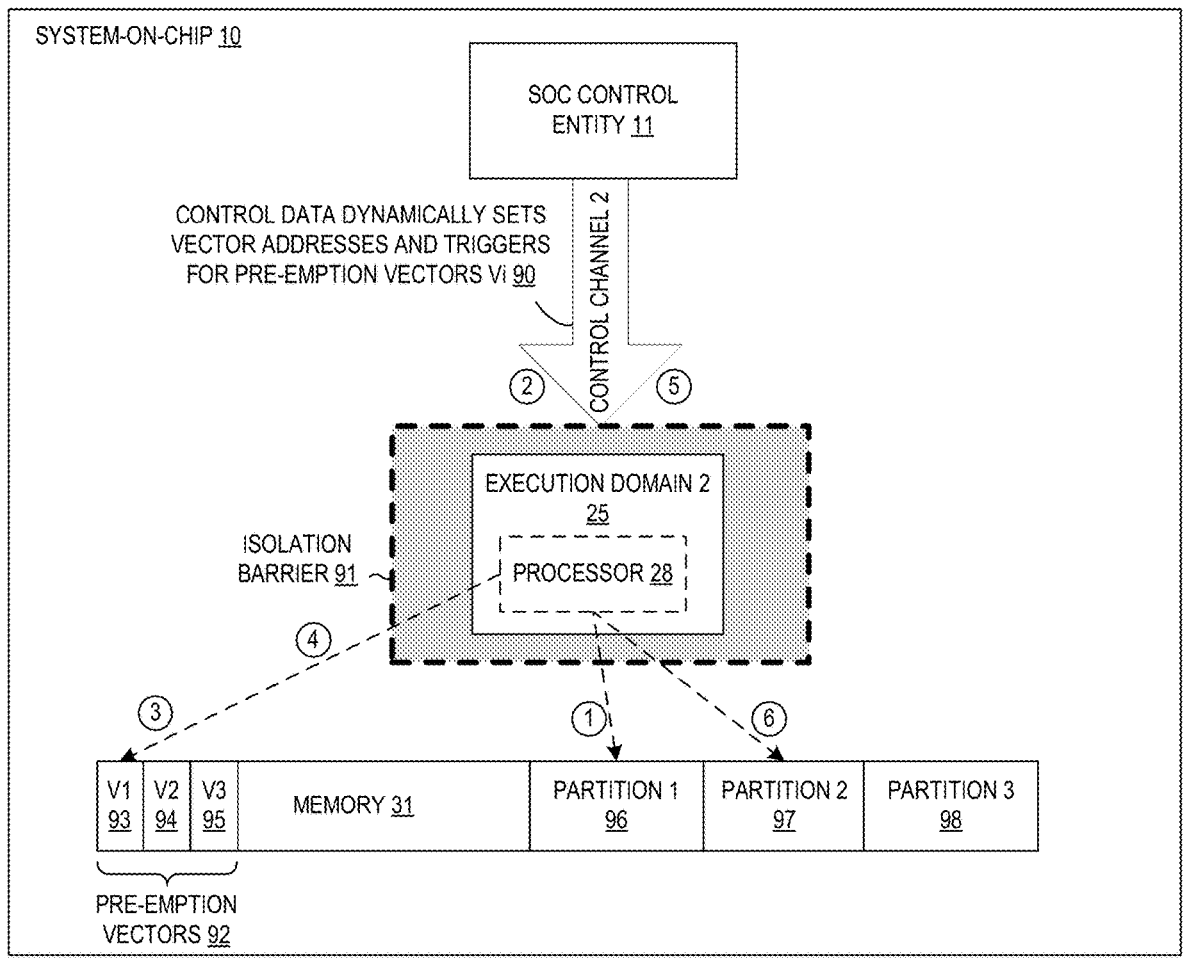
FIG. 8 is a simplified schematic block diagram of the SOC isolation control system architecture to illustrate how the SoC control entity generates control data which includes a set of pre-emption interrupt vector addresses and a set of pre-emption interrupt triggers to create a dynamic runtime isolation barrier that specifies different pre-emption actions taken by the execution domain when switching between partitions in accordance with selected embodiments of the present disclosure.

For an improved understanding of selected embodiments of the present disclosure, reference is now made to FIG. 8 which depicts a simplified schematic block diagram of the SOC system 10 shown in FIG. 2 to illustrate how the SoC control entity 11 generates control data 90 over a control channel 2 that includes a set of pre-emption interrupt vector addresses and a set of pre-emption interrupt triggers to create a dynamic runtime isolation barrier 91 that specifies different pre-emption actions taken by the execution domain 25 when switching between partitions 96-98. In particular, control data 90 that is received from the SoC control entity 11 may be used to configure a separate isolation barrier 91 for each of n partitions hosted by an execution domain (e.g., 25), thereby creating n dynamic runtime isolation barriers for each of N execution domains. Thus configured, each dynamic runtime isolation barrier provides enforceable mechanisms for runtime protection, isolation, virtualization, and execution control (context-switching) that are independent from those of the various processor-based subsystems, and which are immune from the kinds of attacks that compromise the integrity of conventional systems.

In selected embodiments, the control data 90 may specify that the isolation barrier 91 allow the associated execution domain 25 to switch between different software execution environments (partitions) by using the control data 90 to configure one or more pre-emption interrupt vectors 92 by defining a set of pre-emption interrupt triggers and a corresponding set of pre-emption interrupt vector addresses 93-95 in memory 31. In response to each trigger initiated by the SoC control entity 11, the execution domain 25 latches or retrieves an independently defined pre-emption vector address (e.g., 93) and the execution domain processor 28 begins fetching instructions from that latched address 93. While three pre-emption vector trigger/address pairs 93-95 are shown, the number of these trigger/address pairs may differ, depending on the defined implementation. In selected embodiments, the pre-emption interrupt is non-maskable by the execution domain processor 28, and may be used by the SoC control entity 11 to switch the execution context or partition at the execution domain 28. Because the pre-emption interrupt is not defined as part of the architecture of the processor or CPU 28, it is outside of the scope of the operating environments in any of the execution domains 24-26, and in fact the execution domain operating environments 24-26 are unaware of the pre-emption interrupt or of the context switching that occurs. This context switching can be routine context switching between partitions based on priority or a time-sliced model, or it may be in response to some specific situation, such as a safety violation, security breach, or low-power state.

Unlike a reset, the pre-emption interrupts are recoverable. And to the extent the pre-emption interrupt is not defined by the underlying processor architecture in the execution domains, any privileged software running in those domains does not attempt to have a handler for this interrupt. Instead, the pre-emption interrupt is an SoC-level mechanism that is best defined and implemented by the SoC architecture. With these properties, the software running in the execution domain partitions does not have to be specially built for this context-switching architecture. Instead, the isolation barrier 91 keeps the partitions strictly isolated from each other and from the rest of the system. In addition, the isolation barrier 91 may be implemented as a virtualization isolation barrier 91 which can remap addresses and virtualize peripherals, all without any software agent running on the execution domain processor.

To enable partition switching with the pre-emption vectors, the SoC control entity 11 installs and maintains code for one or more pre-emption vectors 92 at the vector address 93-95 in memory 31. Although the pre-emption vector code 92 is executed by the execution domain processor 28, it is stored in external memory 31 so that it is not part of the execution domain 25 or any of its partitions. In addition, the pre-emption vector code 92 cannot be modified by the execution domain processor 28 or any privileged software running in any of the partitions. Before the pre-emption trigger is initiated, the SoC control entity 11 sends control data 90 to map the memory region 92 containing the pre-emption interrupt handler. This memory region 92 is marked as "execute only", and the execution domain processor 28 has no ability to write into this memory space, and can only fetch and execute the code found there. This code saves the state of the current context executing on the processor 28, and then loads the context for the next partition to be executed. This is necessary because there are registers in the processor core 28 which can only be accessed by the core, and the state of these registers must be saved/restored on a context switch. While the execution domain processor 28 is saving the current core state and loading the state for the next partition, the SoC control entity 11 is sending control data 90 for the address ranges which the next partition is allowed to access, and the virtual mappings for those address ranges. Once the SoC control entity 11 has completed this task, the "next" partition has become the current partition, and the execution domain processor is directed to start executing the current partition code.

To illustrate an example sequence of operations for using pre-emption vectors to switch between partitions, FIG. 8 depicts a first step (1) where the execution domain 25 is executing software running in a first partition 96. Subsequently at a step (2), the SoC control entity 11 issues control data 90 which activates one of the defined pre-emption interrupt triggers. At step (3), the execution domain processor 28 responds to the trigger by latching the pre-emption vector address 93 associated with the trigger, and at step (4), the execution domain processor 28 starts fetching instructions from the latched pre-emption vector address 93. Subsequently at a step (5), the SoC control entity 11 issues new control data 90 which removes access from the first partition 96 (e.g., by saving the current control channel state from the first partition 96) and adds access to a second partition 97 (e.g., by loading the previously stored control channel state for the second partition 97). And at step (6), the execution domain processor 28 switches to execute software running in a second partition 97 once the vector code has been executed.

Partitions can be switched based on usage models, priority models, time-slice models, or any other cause including safety/security violations. The partition being switched out has no knowledge of the switch, and when it comes back into context (switched back in), it begins executing right where it last left off. This defines an SoC level context-switch mechanism that requires no software agent in the execution domains, and is out of scope of any privileged software running in those domains.

Since the partitions in each execution domain have no fixed ID number, each execution domain can have as many as n independent software partitions which are run one at a time under control of the SoC control entity 11 which switches between the partitions and the isolation between the partitions via the control data stream 90. As each partition is switched into context, the SoC control entity 11 sends new control data 90 to configure the virtualization isolation barrier 90 with allowed address ranges, peripherals, interrupts, and virtual mappings for the new partition. Thus, each partition runs in its own space, isolated from the other partitions, and all under the control of the SoC control entity. While any (or all) of the partitions running on any of the execution domains may have a traditional hypervisor-based context-switching environment running, this CPU-based context-switching does not interfere or conflict with the SoC-level context switching that is controlled by the SoC Control entity 11.

There are a number of benefits and advantages of using the control data 90 to switch between partitions on an execution domain by configuring the isolation barrier 91 with the pre-emption interrupt vector(s) 92 having defined pre-emption interrupt triggers and corresponding pre-emption interrupt vector addresses. First, the context/partition switching between multiple (n) software partitions on an execution domain processor is controlled on the SoC level without use of any resources of the execution domain processors, including privilege execution modes of those processors. Second, SoC level context-switching can be provided for multiple (N) execution domains which may have different underlying processor architectures or types. In addition, SoC level context-switching can implement context-switching and load-balancing across execution domains of same microprocessor architecture.

Figure 9:
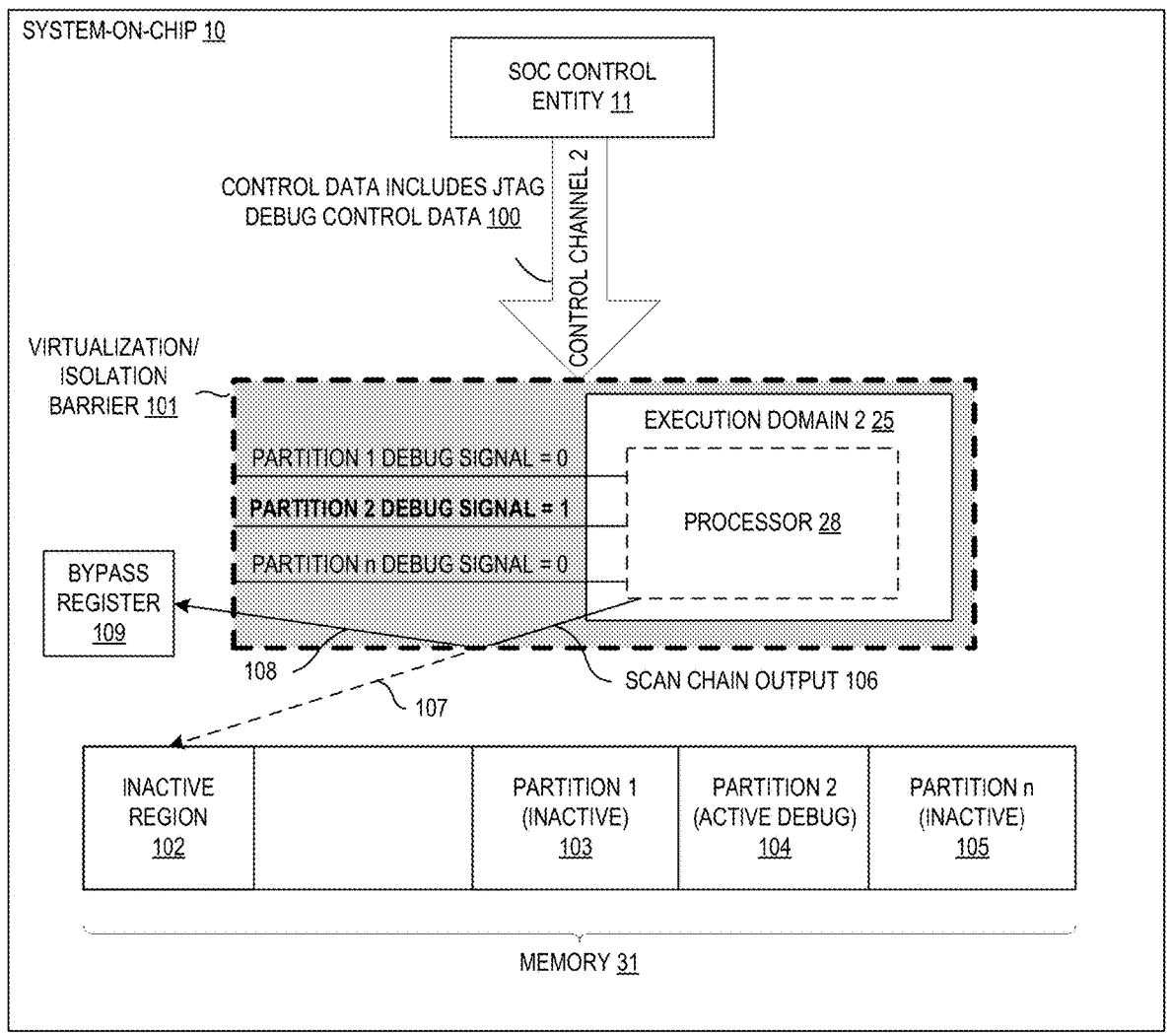
FIG. 9 is a simplified schematic block diagram of the SOC isolation control system architecture to illustrate how the SoC control entity generates control data which includes JTAG debug control data to create a dynamic runtime isolation barrier in accordance with selected embodiments of the present disclosure.

For an improved understanding of selected embodiments of the present disclosure, reference is now made to FIG. 9 which depicts a simplified schematic block diagram of the SOC system 10 shown in FIG. 2 to illustrate how the SoC control entity 11 generates control data 100 over a control channel 2 that includes JTAG debug control data to create a dynamic runtime virtualization isolation barrier 101 that controls and limits JTAG debug operations to access only a specified partition running on the execution domain 25 and to prevent access to the other n-1 partitions running on the execution domain 25. With existing SoC systems, a partition running in a given execution domain that is under JTAG debug can potentially access all partitions running on that execution domain processor. Conventional attempts to limit JTAG debug operations rely on the privilege execution mode of the underlying processor in the execution domain, but independent software partitions running at the same privilege level cannot be distinguished by such methods. And while extensive and expensive third-party debug tooling is available and widely used for debugging the execution domain processor, such tools are not designed to limit operations to specific partitions on the execution domain processor.

In order to restrict or control partition access during JTAG debug operations, the control data 100 that is received from the SoC control entity 11 may be used to configure a separate virtualization isolation barrier 101 for each of n partitions hosted by an execution domain (e.g., 25), thereby creating n dynamic runtime isolation barriers for each of N execution domains. In addition, the control data 100 includes JTAG debug control data for selectively enabling or disabling JTAG debug operations on a per-partition basis, and each execution domain (e.g., 25) includes JTAG circuitry which is connected and configured to respond to the control data 100 to precisely isolate JTAG debug operations to a specific partition or set of partitions. Within a partition, the virtualization isolation barrier 101 is configured to restrict the access that the debugger has on specific ranges in memory. And it can do all this while supporting standard JTAG debug tooling. Controlled by control data 100 from the independent SoC control entity 11, the disclosed JTAG debug control mechanism is out of scope of any privilege software running in the execution domains, and thus cannot be compromised by such software.

In selected embodiments, the control data 100 specifies, for each partition, a JTAG debug enable/disable signal (e.g., Partition 1 Debug Signal, Partition 2 Debug Signal, . . . Partition n Debug Signal) that the virtualization isolation barrier 101 provides to the execution domain processor 28. If the JTAG debug signal has not been expressly enabled for a partition, then it is disabled by default for the partition (e.g., Partition 1 Debug Signal=0). For a currently active partition in the execution domain 25 (e.g., Partition 2 104), if the JTAG debug signal is enabled (e.g., Partition 2 Debug Signal=1), then the debug signal to the processor 28 is asserted while that partition 104 is actively executing. However, if the JTAG debug signal is not enabled (e.g., Partition 2 Debug Signal=0) for a currently active partition in the execution domain 25 (e.g., Partition 2 104), then the debug signal to the processor 28 is de-asserted while that partition 104 is executing. The JTAG debug signals to each execution domain processor 28, which is under the control of the control data stream 100, is reevaluated on each partition context switch and either enabled or disabled accordingly.

In addition, the control data 100 can configure the virtualization isolation barrier 101 to switch the scan chain output 106 to the scan chain bypass register 109 on a memory access 107 to an inactive region (e.g., 102), either thru the processor 28 or directly thru the memory envelope provided by the virtualization isolation barrier 101, thereby restricting the viewing of selected memory regions even for a partition under debug. In selected embodiments, if JTAG debug operations have been enabled for a partition (e.g., Partition 2 104), then for each address range which that partition has access through the virtualization isolation barrier 101, the JTAG debug is marked as "active" or "inactive." If an address range is marked as "active" (e.g., for Partition 2 104), then the debug memory windows and disassembly windows work as normal. However, if an address range is marked as "inactive" (e.g., Inactive Region 102), then a debug memory accesses 107 to the inactive region is switched to the scan chain bypass register 109 as the output source, whether they be initiated by a memory window or a disassembly window. For example, by routing the scan output thru a JTAG-defined 1-bit bypass register 109, no information about the inactive memory region 102 is leaked. In no case will the debugger have access to any memory region/address range which the partition running without debug does not have access to. This prevents viewing sensitive code/data thru the debugger. With this approach, existing third-party tools in the form of libraries and data sets can be kept isolated, even as the code that executes them is debugged.

When a partition context-switch occurs and the control data 100 has not enabled the JTA debug signal for the new active partition, the debug signal to the core is de-asserted and no debug operation is possible. To provide additional access protection, the virtualization isolation barrier 101 may respond to the debug enable/disable signals in the control data 100 by selectively disabling the Test Data Input (TDI), Test Data Output (TDO), and Test Clock (TCK) signals going to the JTAG header, thereby making the header electrically inert in whole or in part when JTAG debug operations are not enabled.

By configuring the virtualization isolation barrier 101 to limit JTAG debug access to specific memory partition regions, there is no need to modify external (typically third-party vendor) JTAG debug hardware and software. This means that debug schemes based on privilege modes of execution will still operate as intended within the software partition. If debug is enabled for user-mode code but not for supervisor mode code, then the external JTAG hardware will continue to detect the privilege mode signals from the core and respond accordingly.

Figure 10:
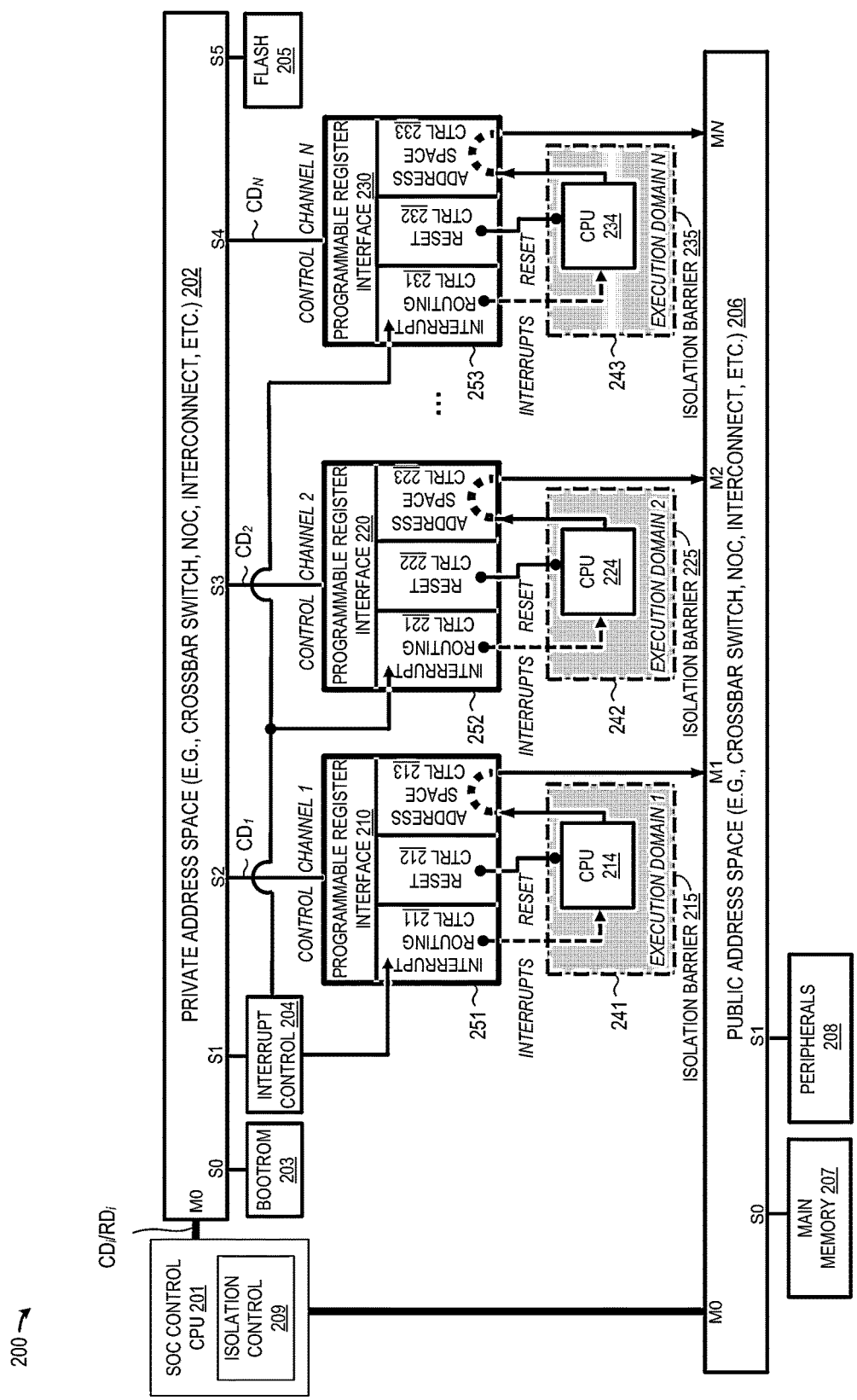
FIG. 10 is a simplified block diagram of an SoC system having a first isolation control architecture where an SoC control CPU uses a private address space to create a plurality of dynamic runtime isolation barriers around a corresponding plurality of execution domains in accordance with selected embodiments of the present disclosure.

For an improved understanding of selected embodiments of the present disclosure, reference is now made to FIG. 10 which depicts a simplified block diagram of an SoC system 200 having a first isolation control architecture where an SoC control CPU 201 uses a private address space 202 (e.g., a system crossbar switch, Network-on-Chip, cache-coherent interconnect, system interconnection infrastructure, etc.) to program a plurality of control channels 251-253 which create a plurality of dynamic runtime isolation barriers 215, 225, 235 around a corresponding plurality of CPUs 214, 224, 234 which are configured to run execution domains 241-243. In the depicted SoC system 200, the SoC control CPU 201 and execution domain CPUs 214, 224, 234 may be identically designed or homogenous, or may include one or more CPUs or cores having different designs. However, the SoC control CPU 201 is physically and programmatically independent from all of the execution domain CPUs 214, 224, 234, and is configured to execute a first isolation control program or thread 209 during boot before any of the execution domain CPUs 214, 224, 234 are released from reset.

The SoC system 200 also includes a public address space 206 (e.g., a crossbar switch, Network-on-Chip, cache-coherent interconnect, system interconnection infrastructure, etc.) connecting the SoC control CPU 201 to main memory 207, which may include one or more levels of cache memory, such as an L1 instruction cache, L1 data cache, and/or L2 cache. In selected embodiments, the caches are internal to an execution domain, inside the isolation barriers 215, 225, 235, and not shared between execution domains. The public address space 206 also connects the SoC control CPU 201 to one or more peripherals 208. In this way, the SoC control CPU 201 may directly access the main memory 207 and peripheral(s) 208 over the public address space 206.

Instead of being connected directly to the main memory 207 or peripheral(s) 208 over the public address space 206, each of the execution domains 241-243 is connected indirectly to the public address space 206 over a corresponding control channel 251-253 which is connected to and controlled by the SoC control CPU 201 to construct and maintain a dynamically programmable isolation barrier 215, 225, 235 around each execution domain processor 214, 224, 234, thereby providing an enforceable and dynamic runtime software isolation mechanism for each execution domain 241-243. Depending on the microarchitecture of the SoC system 200, each control channel 251-253 can be controlled and programmed by the SoC control CPU 201 using the private address space 202 which gives the SoC control CPU 201 exclusive access to secure resources, such as boot ROM 203, interrupt controller 204, a flash controller 205 (storing, for example, external firmware images), or other resources, such as SRAM memory, timer registers, etc. In particular, the SoC control CPU 201 executes the isolation control program or thread 209 to generate control data $CD_{1-N}$ which is transmitted over the private address space 202 to program the control channels 251-253. In particular, control channel 1 251 is connected at switching address S2 of the private address space 202 to receive programming control data $CD_1$ from the SoC control CPU 201. In similar fashion, control channel 2 252 is connected at switching address S3 of the private address space 202 to receive programming control data $CD_2$ from the SoC control CPU 201, and control channel 3 253 is connected at switching address S4 of the private address space 202 to receive programming control data CD N from the SoC control CPU 201.

With this arrangement of intervening control channels 251-253, the execution domains 241-243 can never access the secure resources 203, 204, 205 because there is no bus master interface from the execution domain CPUs 214, 224, 234 in the private address space of SoC control CPU 201. In addition, the main memory 207 and peripheral(s) connected in the public address space 206 cannot access resources in private address space 202 for the same reason. The arrangement of intervening control channels 251-253 also means that the execution domains 241-243 can only access the secure resources 203, 204, 205, 251-253 through service requests to the SoC control CPU 201 over the public address space 206 or through a messaging interface in the control channels 251, 252, 253.

By programming the control channels 251-253 with a control channel data stream upon initialization of the SoC system 200, the SoC control CPU 201 configures the isolation barriers 215, 225, 235 to provide an "enclosure" protection function around each execution domain 241-243 which is connected and configured to communicate with SoC system resources (e.g., address space(s) 206, memory 207, peripherals 208, etc.) via the control channels 251-253. As disclosed herein, each control channel 251-253 may be implemented with any suitable combination of control registers, routing access circuits, and/or electrical connections (power, clock, etc.) which attach or connect the execution domain to the SoC system. For example, each control channel 251-253 may be constructed with at least an interrupt routing block 211, 221, 231, a reset control block (RCB) 212, 222, 232, and an address space controller (ASC) block 213, 223, 233. In addition, each control channel 251-253 may include one or more control and/or status registers which are accessible over a programmable register interface 210, 220, 230 solely from the private address space 202. In this arrangement, software executing in the SoC control CPU 201 may securely and dynamically configure each control channel 251-253 during startup or runtime to create the isolation barriers 215, 225, 235 which control access to and from each execution domain CPU 214, 224, 234 associated with said control channel 251-253. In addition, the SoC control CPU 201 may send new control data $CD_i$ at any time, allowing each control channel (e.g., 251) to be dynamically reconfigured during runtime. In addition, each control channel (e.g., 251) can send return data $RD_i$ back to the SoC control CPU 201, by using the corresponding control channel (e.g., 251), thereby allowing the SoC control CPU 201 to monitor the status/health of the execution domain 241 and to take action depending on the status of the return data. As shown, there is also a connection between the SoC control CPU 201 and the public address space 206 so that the SoC control CPU 201 can access the public address space.

Since connections from the execution domains 241-243 to system resources (e.g., 207, 208) on the public address space 206 are made through the control channels 251-253, each ASC block 213, 223, 233 can be programmed by the SoC control CPU 201 to assign peripherals 208 to a specific execution domain, or permit peripherals to be shared among two or more domains. In similar fashion, access to appropriate regions of memory 207 and to appropriate subsets of peripherals 208 can be allowed or blocked by programming the ASC block 213, 223, 233 of an associated control channel 251-253. In either case, an access request from the execution domain processor (e.g., 214) to a peripheral or memory address location is processed by the isolation barrier (e.g., 215) by first routing the access request to the ASC block (e.g., 213) which checks the access request against the allowed or blocked peripherals or memory addresses, and only passes the access request to the public address space 206 if the access request is for an allowed peripheral or memory address. By default, each ASC block 213, 223, 233 may be configured to block all outgoing access requests from an execution domain 241-243 except for the regions of memory and peripheral address space configured by the SoC control CPU 201 to be allowed for the corresponding execution domain.

In similar fashion, each control channel 251-253 may include an interrupt routing block 211, 221, 231 which is programmed by the SoC control CPU 201 to handle processing of external interrupts by the execution domain 241-243. For example, when each control channel 251-253 is connected to receive interrupts from the interrupt controller 204, the interrupt routing block 211, 221, 231 can be programmed by the SoC control CPU 201 to assign each execution domain one or more peripherals 208 that are allowed to generate interrupts for that execution domain. Thus, rather than allowing each interrupt to access each execution domain, the interrupt request to an execution domain CPU (e.g., 214) is effectively processed by the isolation barrier (e.g., 215) when the programmed interrupt routing block 211, 221, 231 determines if a received interrupt is an "allowed" interrupt (e.g., an interrupt from a peripheral assigned to its execution domain). If not, then the interrupt routing block (e.g., 211) prevents the interrupt request from reaching the execution domain CPU (e.g., 214). But if the interrupt is from an "allowed" peripheral, then the interrupt routing block 211, forwards the interrupt to its corresponding execution domain CPU 214.

In addition, each control channel 251-253 may include a reset control block 212, 222, 232 which is programmed by the SoC control CPU 201 to establish one or more reset vector addresses and to provide a control register to release an execution domain CPU from a power-on-reset and to trigger the reset of the execution domain CPU for different types of resets, such as a warm reset and watchdog timer reset by the SoC control CPU 201. Each type of reset can have an independent reset vector address stored in memory 207, which allows the software at these vector addresses to operate independently from the software at other reset vector addresses. In addition, the resetvector addresses specified in the reset control block 212, 222, 232 of the control channels 251-253 cannot be overridden by software in one of the execution domains, even if the instruction set architecture for the execution domain CPU permits privileged software to configure vector addresses. In this way, there is no fixed reset behavior that is fixed in hardware and applied to all execution domains 241-243. Instead, each reset request to an execution domain CPU (e.g., 214) is effectively processed by the isolation barrier (e.g., 215) when the programmed reset control block 212, 222, 232 determines if a received reset is a reset type that is "allowed" for the execution domain (e.g., 241). If not, then the reset control block (e.g., 212) prevents the reset request from reaching the execution domain CPU (e.g., 214). But if the reset is an "allowed" reset request, then the reset control block 212 forwards the reset to its corresponding execution domain CPU 214 which is configured to latch a corresponding reset vector address from memory where software can be fetched and executed by the execution domain CPU.

Figure 11:
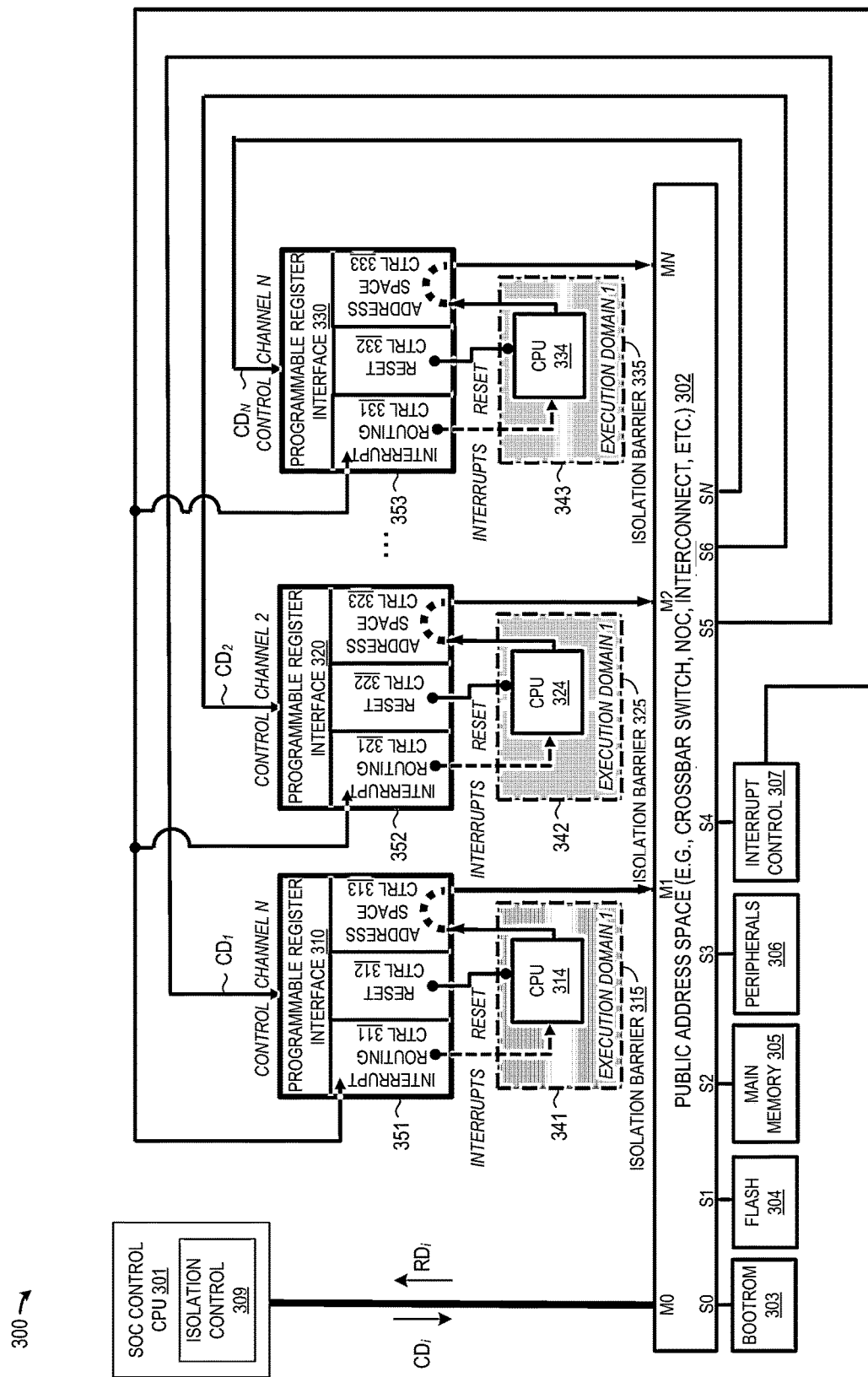
FIG. 11 is a simplified block diagram of an SoC system having a second isolation control architecture where an SoC control CPU uses a public address space to create a plurality of dynamic runtime isolation barriers around a corresponding plurality of execution domains in accordance with selected embodiments of the present disclosure.

For an improved understanding of selected embodiments of the present disclosure, reference is now made to FIG. 11 which depicts a simplified block diagram of an SoC system 300 having a second isolation control architecture where an SoC control CPU 301 uses a public crossbar switch 302 to program a plurality of control channels 351-353 which create a plurality of dynamic runtime isolation barriers 315, 325, 335 around a corresponding plurality of execution domain CPUs 314, 324, 334 which are configured to run execution domains 341-343. In the depicted SoC system 300, the SoC control CPU 301 and execution domain CPUs 314, 324, 334 may have homogenous or different designs, but the SoC control CPU 301 is physically and programmatically independent from all of the execution domain CPUs 314, 324, 334, and is configured to execute a first isolation control program or thread 309 during boot before any of the execution domain CPUs 314, 324, 334 are released from reset.

As depicted, the system crossbar switch or interconnect 302 connects the SoC control CPU 301 to SoC system resources, such as boot ROM 303, a flash controller 304, main memory 305, one or more peripherals 306, an interrupt controller 307, and/or other resources, such as SRAM memory, timer registers, etc. In this way, the SoC control CPU 301 may directly access the SoC system resources 303-307 over the public address space of the system crossbar switch or interconnect 302. However, instead of being connected directly to the SoC system resources 303-307 over the system crossbar switch 302, each of the execution domain CPUs 314, 324, 334 is connected indirectly to the system crossbar switch or interconnect 302 over a corresponding control channel 351-353, each of which is programmed and controlled by the SoC control CPU 301 to construct and maintain a dynamically programmable isolation barrier 315, 325, 335 around each execution domain processor 314, 324, 334, thereby providing an enforceable and dynamic runtime software isolation mechanism for each execution domain 341-343. However, instead of using a private crossbar switch or interconnect to program the control channels (as depicted in FIG. 10), the SoC control CPU 301 controls and programs the control channels 351-353 by sending control data messages $CD_i$ over the public crossbar switch or interconnect 302 to program the control channels 351-353. As a result, the control channel 1 351 is connected at switching address S5 of the public crossbar switch/interconnect 302 to receive programming control data $CD_1$ from the SoC control CPU 301. In similar fashion, control channel 2 352 is connected at switching address S6 of the public crossbar switch/interconnect 302 to receive programming control data $CD_2$ from the SoC control CPU 301, and control channel 3 353 is connected at switching address S7 of the public crossbar switch/interconnect 302 to receive programming control data $CD_N$ from the SoC control CPU 301. With this arrangement of intervening control channels 351-353, the execution domains 341-343 can only access the SoC system resources 302-307 when the control data $CD_{1-N}$ from the SoC control CPU 301 programs the control channels 351-353 to allow such access requests through the isolation barriers 315, 325, 335.

By programming the control channels 351-353 with a control channel data stream upon initialization of the SoC system 300, the SoC control CPU 301 configures the isolation barriers 315, 325, 335 to provide an "enclosure" protection function around each execution domain 341-343 which is connected and configured to communicate with SoC system resources 302-307 via the control channels 351-353. As disclosed herein, each control channel 351-353 may be implemented with any suitable combination of control registers, routing access circuits, and/or electrical connections (power, clock, etc.) which attach or connect the execution domain to the SoC system. For example, each control channel 351-353 may have an interrupt routing block 311, 321, 331, a reset control block (RCB) 312, 322, 332, and an address space controller (ASC) block 313, 323, 333. In addition, each control channel 351-353 may include one or more control and/or status registers which are accessible over a programmable register interface 310, 320, 330 from the public address space 302. In this arrangement, software executing in the SoC control CPU 301 may securely and dynamically configure each control channel 351-353 during startup or runtime to create the isolation barriers 315, 325, 335 which control access to and from each execution domain CPU 314, 324, 334 associated with said control channel 351-353. In addition, the SoC control CPU 301 may send new control data $CD_i$ at any time, allowing each control channel (e.g., 351) to be dynamically reconfigured during runtime. In addition, each control channel (e.g., 351) can send return data $RD_i$ back to the SoC control CPU 301 by using the public crossbar switch 302, thereby allowing the SoC control CPU 301 to monitor the status/health of the execution domain 341 and to take action depending on the status of the return data.

Since connections from the execution domains 341-343 to system resources 302-307 on the system crossbar switch 302 are made through the control channels 351-353, each ASC block 313, 323, 333 can be programmed by the SoC control CPU 301 to assign address locations in memory 305 and/or peripherals 306 to one or more execution domains. Once programmed, an access request from the execution domain processor (e.g., 314) to a peripheral or memory address location is processed by the isolation barrier (e.g., 315) by first routing the access request to the ASC block (e.g., 313) which checks the access request against the allowed or blocked peripherals or memory addresses, and only passes the access request to the system crossbar switch/interconnect 302 if the access request is for an allowed peripheral or memory address. In similar fashion, each control channel 351-353 may include an interrupt routing block 311, 321, 331 which is programmed by the SoC control CPU 301 to assign each execution domain one or more "allowed interrupts." Once programmed, the interrupt routing block (e.g., 311) effectively enables the isolation barrier (e.g., 315) to process an interrupt request to an execution domain CPU (e.g., 314) by determining if a received interrupt is an "allowed" interrupt so that the interrupt routing block (e.g., 311) forwards any "allowed" interrupt to its corresponding execution domain CPU 314, but otherwise prevents the interrupt request from reaching the execution domain CPU. In addition, each control channel 351-353 may include a reset control block 312, 322, 332 which is programmed by the SoC control CPU 301 to establish one or more reset vector addresses for different types of resets. Once programmed, the reset control block (e.g., 312) effectively enables the isolation barrier (e.g., 315) to process each reset request to an execution domain CPU (e.g., 314) by determining if a received reset is a reset type that is "allowed" for the execution domain (e.g., 341). If not, then the reset control block (e.g., 312) prevents the reset request from reaching the execution domain CPU (e.g., 314). But if the reset is an "allowed" reset request, then the reset control block 312 forwards the reset to its corresponding execution domain CPU 314 which is configured to latch a corresponding reset vector address from memory where software can be fetched and executed by the execution domain CPU.

Each of the SoC control CPUs and execution domain CPUs described herein may be configured to execute instructions and to process data according to a particular instruction set architecture (ISA). In a selected embodiment, a highly suitable example of a design for a processor core or CPU is a StarCore® SC3850 processor core that runs at 1 GHz. Those of ordinary skill in the art also understand the present invention is not limited to any particular manufacturer's microprocessor design. The processor core or CPU may be found in many forms including, for example, any 32-bit or 64-bit microprocessor manufactured by NXP®, Motorola®, Intel®, AMD®, Sun® or IBM®. However, any other suitable single or multiple microprocessors, microcontrollers, or microcomputers may be utilized. In the illustrated embodiment, each of the SoC control CPUs and execution domain CPUs may be configured to operate independently of the others, such that all CPUs may execute in parallel. In some embodiments, each of the CPUs may be configured to execute multiple threads concurrently, where a given thread may include a set of instructions that may execute independently of instructions from another thread. Such a CPU may also be referred to as a multithreaded (MT) core. Thus, a single multi-core SoC 200 with four cores will be capable of executing a multiple of four threads in this configuration, with a first core handling the SoC control CPU functionality as a top priority core, and with the remaining cores handling the functionality of the execution domain CPUs. However, it should be appreciated that the invention is not limited to four processor cores or CPUs, and that more or fewer cores or CPUs can be included. In addition, the term "core" refers to any combination of hardware, software, and firmware typically configured to make requests and/or receive status information from associated circuitry and/or modules (e.g., one or more peripherals, as described below). Such cores include, for example, digital signal processors (DSPs), central processing units (CPUs), microprocessors, and the like. These cores are often also referred to as masters, in that they often act as a bus master with respect to any associated peripherals. Furthermore, the term multi-core (or multi-master) refers to any combination of hardware, software, and firmware that includes two or more such cores, regardless of whether the individual cores are fabricated monolithically (i.e., on the same chip) or separately. Thus, a second core may be the same physical core as first core, but has multiple modes of operation (i.e., a core may be virtualized).

In accordance with selected embodiments of the present disclosure, the SoC isolation control architecture may be implemented with a multithreaded processor architecture whereby a single processor core runs two or more hardware execution threads. One example of such a multi-threading processor is a switch-on event multithreading (SOEMT) processor which provides prioritized, pre-emptive thread scheduling in response to assertion of events. In particular, there are properties of SOEMT processors which may be used to provide execution domain isolation on an SOEMT processor where a single CPU core supports N hardware threads, where N is equal to at least 1 plus the total number of execution domains supported on the SoC system. In prioritizing the N threads, a first thread (Thread 0) has the highest hardware-defined priority for use with executing the SoC control entity function. The remaining lower priority threads may have relative priorities for running the execution domains of the SoC system. For example, threads executing real-time processes should have a higher priority than threads executing non-real-time processes. During each processor cycle, instructions are executed for a highest-priority, active thread. When a higher-priority thread becomes active, the executing thread is pre-empted by the higher-priority thread, and only resumes execution when all higher-priority threads are inactive. Each thread may be active or inactive, and inactive threads are activated by assertion of events assigned to that thread.

In SOEMT processors, events are physical signals that originate from either hardware or software. Events are similar to interrupt requests, but with two critical differences. The first difference is that events never force asynchronous redirection of program flow. Once activated, a thread runs to completion, and subsequent event assertions are recorded, but not recognized, until the software in the thread executes a wait-for-event (WFE). If a WFE is executed when the thread has no other asserted events, that thread becomes inactive. The second difference between events and interrupt requests is that the address at which execution resumes following a WFE is controlled by software and is typically the address following the WFE instruction or another address specific to the software state when executing that particular WFE. In contrast, interrupts save the previous execution address and commence execution at a predefined interrupt vector address.

As the highest priority thread, Thread 0 will, upon activation, pre-empt any other thread and cannot itself be pre-empted. The execution domain isolation mechanisms discussed herein take specific advantage of these two properties. Each hardware thread has a dedicated set of registers that include, at least, all architecturally-defined user mode registers of the ISA.

Unlike typical multithreaded processors, threads are not isomorphic. Thread 0 is the only thread having full access to the physical address space, including the full machine-mode control and status register (CSR) space in the case of a RISC-V processor. In addition, only Thread 0 is active after hardware reset. Further, Thread 0 is the only thread that can: (1) execute instructions that force another thread into a known state, which is used to initialize the other threads; (2) recover from catastrophic errors or software compromise within the other threads; and (3) initiate context switching by threads supporting execution domains with multiple, independent software partitions. Privilege levels available within each thread are those defined by the underlying ISA, but, even at the highest privilege level, threads other than Thread 0 do not have full access to low-level CPU hardware or the full, physical address space.

Figure 12:
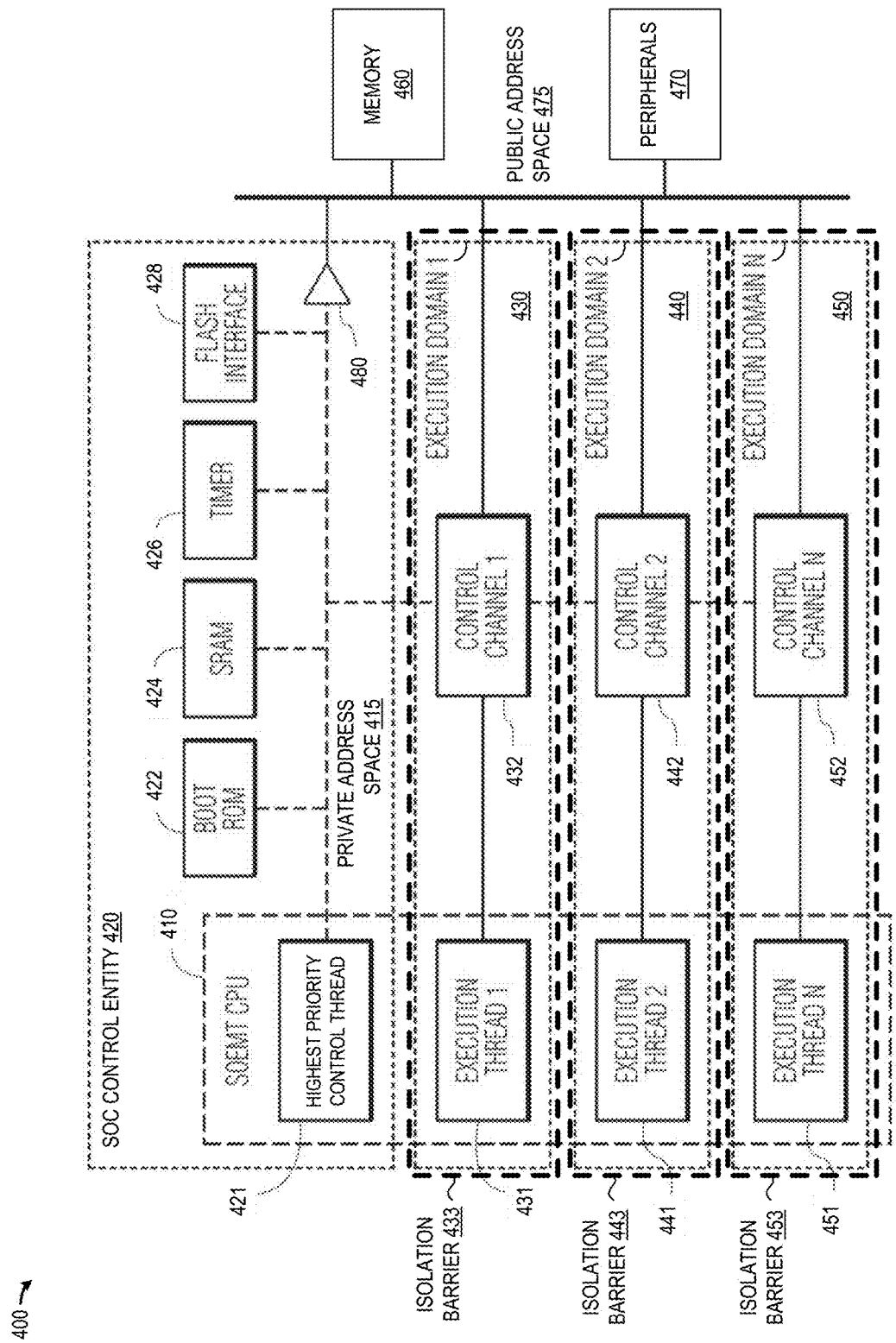
FIG. 12 is a simplified block diagram illustrating an SOC isolation architecture which uses a single, multi-threaded processor core to create a dynamic runtime isolation barrier around each execution domain in accordance with selected embodiments of the present disclosure.

For an improved understanding of selected embodiments of the present disclosure, reference is now made to FIG. 12 which depicts a simplified block diagram of an SOC isolation architecture 400 which uses a single, multi-threaded SOEMT processor core 410 to create a dynamic runtime isolation barrier around each execution domain. As depicted, the single, multi-threaded SOEMT processor core 410 executes an SoC control entity domain 420 and all execution domains (e.g., 430, 440, 450) in separate threads. Private address space 415 of the SoC control entity domain 420 is designed into the CPU hardware. While the multi-threaded SOEMT processor core 410 includes four hardware threads, any number of hardware threads greater than or equal to two may be present.

Depending on the microarchitecture, the SoC control entity domain 420 can be implemented within the SOEMT processor 410 on thread 0 (the "isolation thread" 421) using thread-aware logic within address-generation hardware, which generates an illegal address exception if a thread other than thread 0 attempts to access an address in private address space 415. Alternatively, the SoC control entity domain 420 can be implemented externally to the SOEMT processor 410 as part of the address decoding. Yet another alternative is to implement the control channels 432, 442, and 452 to map the addresses which would otherwise access the private address space 415 to access different locations, either within the public address space 475 or (if private resources are present within execution domains) internal to the respective execution domains 430, 440, or 450. If the SoC control entity domain 420 is implemented externally to the SOEMT processor 410, the originating thread number accompanies each memory transaction as an ancillary attribute. Private address space 415 gives the SoC control entity domain 420 exclusive access to secure resources, such as boot ROM 422, SRAM 424, timer registers 426, and a flash controller 428 (storing, for example, external firmware images). On the other hand, each of the execution domains 430, 440, 450 and the SoC control entity domain 420, can access the public address space 475 through their control channels, including, for example, memory 460 and peripherals 470. In this manner, the execution threads (execution threads 431, 441, 451) are not isomorphic to the isolation thread, in that they are not directly provided access to the secure hardware registers and memories within the private address space 415. The execution threads only access the secure resources through service requests to the highest priority isolation thread 421 (e.g., thread 0). In addition, the peripheral(s) 470 in public address space 475 cannot access resources in private address space 415, as indicated by unidirectional interface block 480.

Each execution domain (430, 440, and 450) is coupled to the SoC control entity domain 420 via a control channel (432, 442, and 452, respectively) that is configured by the SoC control entity domain 420 upon initialization of the SoC system. Once configured, each control channel 432, 442, 452 effectively creates an isolation barrier 433, 443, 453 around a corresponding execution domain 430, 440, 450 so that the execution domain threads 431, 441, 451 can have only approved or "allowed" communications with system resources. To create the isolation barriers 433, 443, 453, the control channels 432, 442, and 452 are constructed with at least an address space controller, a reset control block, and an interrupt routing block. In addition, each control channel 432, 442, and 452 may have control/status registers, accessible solely from the private address space 415 of the SoC control entity domain 420, that allow software executing in the highest priority control thread 421 to configure access allowed by the execution threads 431, 441, or 451 associated with said control channel. The control channel management interfaces (designated by the dashed line connecting the isolation domain private address space 415 to the control channels 432, 442, and 452) are accessible solely by the highest priority control thread 421 via the private address space 415.

Memory bus connections from the execution domains 430, 440, 450 are made through the corresponding control channel 432, 442, 452 which effectively creates the isolation barrier 433, 443, 453. ASC programming can assign peripherals 470 to a specific execution domain, or permit peripherals to be shared among two or more domains. Access to appropriate regions of memory and to appropriate subsets of peripherals can be through the ASC of an associated control channel. By default, the ASC blocks all outgoing access from an execution domain thread, so only those regions of memory and peripheral address space configured by the highest priority control thread 421 for that execution domain are accessible.

In addition, the execution domains 430, 440, 450 are connected to receive external interrupts the interrupt routing block of the control channel 432, 442, 452. If a peripheral is assigned to an execution domain, then interrupts from that peripheral block are allocated to that execution domain. Otherwise, the interrupt is blocked.

The reset control block of each control channel 432, 442, 452 establishes addresses of reset vectors and provides a control register to release a thread from a power on reset and to trigger the reset of the hardware thread for various other types of resets. Each reset type can have independent reset vector addresses, which allows the software at these vector addresses to operate independently from the software at other reset vector addresses. In addition, the vector addresses specified in the reset control block cannot be overridden by software in an execution domain, even if the ISA permits privileged software to configure vector addresses.

An inter-thread event generation mechanism may be used for the execution threads 431, 441, and 451 to request services from highest priority control thread 421. Depending on the architecture of SOEMT processor core 410, the inter-thread event generation mechanism can be a machine instruction that asserts a hardware event, a subset of the processor's normal system call/environment call mechanism, or a predefined programmatic interface using inter-thread flag bits that generate events to the target thread.

On an SOEMT processor core 410 using RISC-V ISA where there is a separate control and status register (CSR) address space, the CSRs pertaining to hardware configuration, clock and power management, physical address space, and the control channels only appear in the machine mode CSR space of thread 0. Other threads have only a basic set of machine mode CSRs as required to conform to the RISC-V Privileged Architecture specification. Threads other than thread 0 on a RISC-V processor can be reset from thread 0. Execution domains can support more than one software partition. If such multi-partition support is needed, the execution domain needs to support a resumable non-maskable interrupt facility, assertable from the isolation domain.

Service requests from an execution domain 430, 440, 450 to the SoC control entity domain 420 are communicated by generating events which activate thread 0. On a RISC-V processor, for example, this can be implemented by decoding a subset of function codes of the environment call (ECALL) instruction to assert particular events to thread 0. But due to ECALL being used for system calls on RISC-V, and assignment of function codes in the RISC-V ABI standard not being yet finalized, embodiments can implement a custom service request instruction for this purpose. For use with ISAs that do not have explicit provision for custom instructions, events alternatively can be asserted by software using inter-context communication (ICC) flag bits accessed via CSRs or memory-mapped I/O, as appropriate for the relevant ISA.

In the disclosed SOEMT processor embodiments, resource control pursuant to a system call is performed by a physically different hardware thread. As a result, privilege escalation within an execution domain cannot be used to override or circumvent proper handling of system calls. Software in any execution domain 430, 440, 450 has no ability to alter the privilege level of software in the SoC control entity domain 420, and cannot access the private address space 414 of the SoC control entity domain 420. And since events activate thread 0 at an address controlled by thread 0 rather than via an exception vector, it is not possible to redirect control by malicious software that corrupts a vector table. Similarly, because the system call handler uses a return stack in private memory accessible solely within the SoC control entity domain 420, neither is a return-oriented attack. Because SOEMT uses a run-to-completion model, with events to thread 0 recognized only after the isolation software has executed a wait-for-event (WFE), control flow in SoC control entity domain 420 is not asynchronously redirected due to actions by software in other domains, which prevents the use of switch-on event multithreading from creating race conditions that might be exploitable. Furthermore, because thread 0 cannot be preempted, interrupts to execution threads that occur while thread 0 is active are not handled until after thread 0 executes a WFE, so interrupts initiated by execution thread activity cannot affect isolation thread execution.

Figure 13:
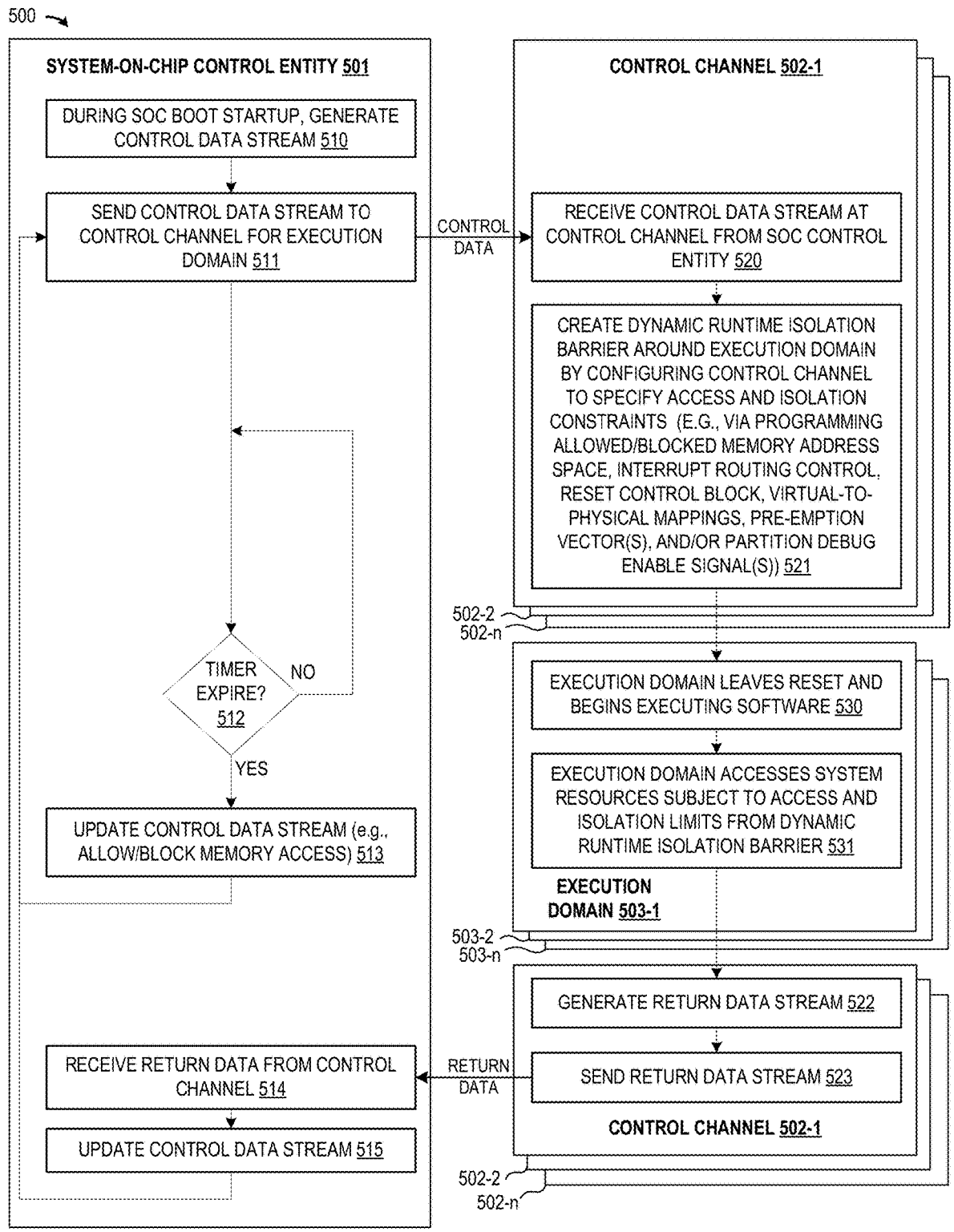
FIG. 13 is a simplified flow chart showing a sequence of steps performed by a SOC control entity and execution domain when creating a dynamic runtime isolation barrier around each execution domain in accordance with selected embodiments of the present disclosure.

For an improved understanding of selected embodiments of the present disclosure, reference is now made to FIG. 13 which depicts a simplified flow chart 500 showing a sequence of steps performed by a SOC control entity 501 in combination with one or more control channels 502 to create a dynamic runtime isolation barrier around each execution domain 503. As discussed above, the sequence begins at SoC boot startup when the SoC control entity 501 generates one or more initial control data streams (step 510). On the SoC system, the SoC control entity 501 is a physically and programmably independent control point which is dedicated to the isolation control function. And rather than providing a software-based isolation function executing in a privileged state on one (or more) of the processors on the SoC system, the SoC control entity 501 is configured to generate a separate runtime control data stream at step 510 for each execution domain being isolated.

At step 511, the SoC control entity 501 sends a control data stream to the control channel 502 for each execution domain 503 being isolated. In selected embodiments, there may be a plurality of control channels 502-1, 502-2, 502-n which correspond, respectively, to a plurality of execution domains 503-1, 503-2, 503-n which are being isolated. In such cases, the SoC control entity 501 may send a separate control data stream to each of the control channels 502-1, 502-2, 502-n. In any case, the control data stream transmission step 511 may be sent over private and/or public crossbar switch or bus interconnect to the plurality of control channels 502 corresponding to the "N" execution domain processors 503.

At step 520, the control channel (e.g., 502-1) receives the control data stream from the SoC control entity 501 over the private and/or public crossbar switch or bus interconnect. In receiving the control data stream, each control channel 502-1 is connected between the SoC control entity 501 and a protected execution domain 503-1 in the SoC system to effectively intercept and control what the execution domain processor is allowed to access or receive from the SoC infrastructure and each addressable memory or peripheral block.

At step 521, the control channel 502-1 processes the control data to create a dynamic runtime isolation barrier around the corresponding execution domain 503-1 by configuring the control channel 502-1 to specify access and isolation constraints. To this end, the control data is stored at the control channel 502-1 in one or more control registers and/or routing or access control blocks which control the electrical connection for each execution domain. Once stored at the control channel 502-1, the control data stream defines the context which the execution domain 503-1 is allowed to execute within. For example, control data may be stored at the control channel 502-1 as an allowed or blocked memory address space in an address space controller. The control data may also be stored at the control channel 502-1 as an allowed or blocked peripheral device in a peripheral access controller. In addition or in the alternative, the control data may be stored at the control channel 502-1 as a blocked interrupt in an interrupt routing controller. In addition or in the alternative, the control data may be stored at the control channel 502-1 as a reset vector address and/or reset trigger in a reset control block. In addition or in the alternative, the control data may be stored at the control channel 502-1 as virtual-to-physical mappings to enable creating of a virtualization barrier around the execution domain. In addition or in the alternative, the control data may be stored at the control channel 502-1 as pre-emption vector data which includes vector addresses and corresponding pre-emption triggers to control partition switching by the virtualization isolation barrier around the execution domain. In addition or in the alternative, the control data may be stored at the control channel 502-1 as partition debug control data to selectively enable or disable debug operations at each partition by the virtualization isolation barrier around the execution domain. As seen from the foregoing, the control channel 502 may be programmed to effectively provide an "enclosure" protection function around each execution domain 503. In contrast, conventional isolation control techniques employ an "exclosure" protection function (e.g., to define an area from which unwanted intrusions are excluded) by using dedicated secure enclave subsystems to construct an isolation barrier around the SoC infrastructure and each addressable memory or peripheral block to block accesses by the execution domains. In addition to the conceptual simplicity of positioning the control channel 502-1 to provide enclosure protection around the execution domains, enclosure-based protection has a number of performance benefits over exclosure-based protection. First, the isolation barrier around the execution domain prevents unauthorized accesses from consuming power or wasting cycles on the shared infrastructure (e.g., crossbar switch, bus interconnect). In addition, the opportunity for malicious software to perform on-chip denial-of-service attacks is reduced. Another advantage is that infrastructure hardware may be reduced since there is no transaction source identifier needed to be conveyed from initiator to responder.

After the isolation barrier is programmed and activated by the control channel 502 at step 521, each execution domain (e.g., 503-1) is activated to leave reset and begin executing software at step 530. As illustrated, the execution domains 503 are controlled to begin executing after the SoC control entity 501 executes during system boot so that the control data stream can be generated and sent to create the dynamic runtime isolation barriers before starting the execution barriers 503.

At step 531, the execution domain (e.g., 503-1) accesses system resources (e.g., addressable memory, peripherals, interrupts, and/or resets) subject to the access and isolation limits established by the dynamic runtime isolation barrier. Controlled exclusively by the control data stream generated by the SoC control entity 501 and provided to the control channel 502, each dynamic runtime isolation barrier prevents any software being executed with the execution domain 503 from being physically able to access the control channel 502. In addition, the dynamic runtime isolation barrier at each execution domain 503 prevents unauthorized outgoing accesses (e.g., memory or peripheral accesses) from leaving their respective execution domains of origin, and also prevents unauthorized incoming accesses (e.g., interrupt requests, resets, etc.) from entering their respective destination execution domains.

To provide feedback to the SoC control entity 501, each control channel 502 at an execution domain 503 may be configured to generate a return data stream at step 522. For example, check points can be established at the execution domain 503-1 to monitor its health or performance. For example, if an illegal memory or peripheral access request is issued by the execution domain 503-1, the control channel 502-1 may be configured to generate a return data stream identifying the illegal memory access attempt. In addition or in the alternative, the return data stream may be generated if an unpermitted interrupt or reset request is sent to the execution domain 503-1. At step 523, the control channel 502-1 sends the return data stream over private and/or public crossbar switch or bus interconnect to the SoC control entity 501.

At step 514, the SoC control entity 501 receives the return data stream from the control channel 502-1 over the private and/or public crossbar switch or bus interconnect. After receiving the return data stream, the SoC control entity 501 updates the control data stream at step 515. For example, the updated control data stream may specify one or more corrective actions, such as reloading the execution domain software, resetting the execution domain, or taking the execution domain offline. Subsequently, the updated control data stream is sent to the control channel at step 511, and the processing sequence continues.

In addition or in the alternative, the SoC control entity 501 may be configured to periodically update or change the control data stream provided to each control channel 502. To this end, the SoC control entity 501 may include a timer that is set after sending the control data stream to the control channel 502. The duration of the timer could be any desired interval, though in selected embodiments, the timer interval is at least sufficient to allow the execution domain(s) to leave reset and begin executing software. For so long as the timer has not expired (negative outcome to detection step 512), there is no action taken by the SoC control entity 501. However, once the timer expires (positive outcome to detection step 512), the SoC control entity 501 updates the control data stream at step 513. For example, the updated control data stream may specify one or more predetermined actions, such as allowing memory accesses to a specified address range that had previous been blocked, or vice versa. Subsequently, the updated control data stream is sent to the control channel at step 511, and the processing sequence continues.

By now, it should be appreciated that there has been provided herein a multi-processor system-on-chip (SOC) method, apparatus, and system for securely operating one or more execution domains on a single integrated circuit system on a chip. As disclosed, the multi-processor SOC includes an execution domain processor that is configured to run a first execution domain which hosts multiple independent software partitions by accessing, for each software partition, one or more SoC resources, where the SoC resources may include an addressable memory, one or more peripherals, an interrupt request and/or a reset request. In addition, the multi-processor SOC includes a first control point processor that is physically and programmatically independent from the execution domain processor and configured to generate a first runtime isolation control data stream for controlling access to the one or more system-on-chip resources by identifying at least a first SoC resource that each software partition is allowed to access, where the first runtime isolation control data stream includes one or more pre-emption interrupts, each including a set of pre-emption interrupt vector addresses and a set of corresponding pre-emption interrupt triggers which are set by the first control point processor. In selected embodiments, the first control point processor is configured to run an isolation control program that is independent from any privileged software running on the execution domain processor. In selected embodiments, the first runtime isolation control data stream is a runtime virtualization isolation control data stream which the first control point processor uses to configure the access control circuit to provide a dynamic runtime virtualization isolation barrier for controlling access to the one or more system-on-chip resources by the first execution domain by identifying at least a first system-on-chip resource that the first execution domain is allowed to access and mapping a virtual address for the first system-on-chip resource to a physical address for the first system-on-chip resource. In other selected embodiments, the first runtime isolation control data stream generated by the first control point processor does not include a device identifier for the first control point processor. In other selected embodiments, the first control point processor is configured to generate the first runtime isolation control data stream before the execution domain processor is released from reset to run the first execution domain. In selected embodiments, the first control point processor is configured to install partition instructions at each pre-emption interrupt vector address in memory. In selected embodiments, the partition instructions stored in memory at each pre-emption interrupt vector address are executed by the execution domain processor to save a current context of a current partition executing on the execution domain processor before loading a saved context for a second partition to be executed on the execution domain processor. In other selected embodiments, the pre-emption interrupts are non-maskable by the execution domain processor. In selected embodiments, the first control point processor may be configured to generate the one or more pre-emption interrupts so that the execution domain processor switches between the independent software partitions based on a partition priority model or a time-slice model. In other embodiments, the first control point processor may also be configured to generate the one or more pre-emption interrupts so that the execution domain processor switches between the independent software partitions in response to a predetermined safety violation event, a predetermined security breach event, or a predetermined low-power state event. The multi-processor SOC also includes an access control circuit connected between the execution domain and the one or more system-on-chip resources and configured to provide a dynamic runtime isolation barrier in response to the first runtime isolation control data stream, where the dynamic runtime isolation barrier enables the execution domain processor to switch between the independent software partitions in response to each separate pre-emption interrupt trigger by fetching partition instructions from a corresponding pre-emption interrupt vector address in memory that is associated with said separate pre-emption interrupt trigger. In other embodiments of the disclosed multi-processor SOC, the first access control circuit is configured to generate feedback data in response to any blocked access by the first execution domain, and the first control point processor is configured to generate an updated runtime isolation control data stream for controlling access to the one or more system-on-chip resources by the first execution domain in response to the feedback data.

In another form, there has been provided a method, system, and apparatus for controlling operations of an execution domain on a multi-processor system-on-chip. In the disclosed method, a runtime isolation control data stream is generated by a control point processor for controlling access to one or more system-on-chip resources by an execution domain processor, where the runtime isolation control data stream includes one or more pre-emption interrupts, each including a set of pre-emption interrupt vector addresses and a set of corresponding pre-emption interrupt triggers which are set by the control point processor. In selected embodiments, the one or more pre-emption interrupts are non-maskable by the execution domain processor. In selected embodiments, the control point processor generates the runtime isolation control data stream before the execution domain processor is released from reset to run the first execution domain. The disclosed method also includes generating, by an access control circuit connected between the execution domain processor and the one or more system-on-chip resources, a dynamic runtime isolation barrier in response to the runtime isolation control data to control access to the one or more system-on-chip resources by the execution domain processor that is physically and programmatically independent from the control point processor, where the dynamic runtime isolation barrier enables the execution domain processor to switch between the independent software partitions in response to each separate pre-emption interrupt trigger by fetching partition instructions from a corresponding pre-emption interrupt vector address in memory that is associated with said separate pre-emption interrupt trigger. In selected embodiments, the partition instructions stored in memory at each pre-emption interrupt vector address are executed by the execution domain processor to save a current context of a current partition executing on the execution domain processor before loading a saved context for a second partition to be executed on the execution domain processor. In addition, the disclosed method includes running a first execution domain on the execution domain processor which is configured to host multiple independent software partitions by accessing, for each software partition, one or more system-on-chip resources in compliance with the dynamic runtime isolation barrier. In selected embodiments, the control point processor generates the runtime isolation control data stream by generating the one or more pre-emption interrupts so that the execution domain processor switches between the independent software partitions based on a partition priority model or a time-slice model. In other embodiments, the control point processor generates the runtime isolation control data stream by generating the one or more pre-emption interrupts so that the execution domain processor switches between the independent software partitions in response to a predetermined safety violation event, a predetermined security breach event, or a predetermined low-power state event. In selected embodiments, the disclosed method may also include generating, by the access control circuit, feedback data in response to any blocked access by the execution domain processor; and then generating, by the control point processor, updated runtime isolation control data stream for controlling access to the one or more system-on-chip resources by the execution domain processor in response to the feedback data.

In yet another form, there has been provided a system-on-chip, device, system, and method of operation for controlling operations of an execution domain. The disclosed system-on-chip includes an interconnect and one or more system-on-chip resources connected to the interconnect. In addition, the disclosed system-on-chip includes a system-on-chip control point entity coupled to the interconnect and configured to generate a plurality of two-way runtime isolation control channel data streams, including at least a first two-way runtime isolation control data stream which includes one or more pre-emption interrupts, each having a set of pre-emption interrupt vector addresses and a set of corresponding pre-emption interrupt triggers which are set by the system-on-chip control point entity. The disclosed system-on-chip also includes a plurality of execution domains that are not directly connected to the interconnect that include at least a first execution domain which is configured to host multiple independent software partitions by accessing, for each software partition, one or more system-on-chip resources in compliance with a dynamic runtime isolation barrier. In addition, the disclosed system-on-chip includes a plurality of access control channels attached, respectively, between the plurality of execution domains and the interconnect. As disclosed, each access control channel that is attached to an execution domain is coupled to receive a corresponding two-way runtime isolation control channel data stream from the system-on-chip control point entity and is configured to define a corresponding dynamic runtime isolation barrier in response to the corresponding two-way runtime isolation control channel data stream, where the corresponding dynamic runtime isolation barrier enables the attached execution domain to switch between independent software partitions in response to each separate pre-emption interrupt trigger by fetching partition instructions from a corresponding pre-emption interrupt vector address in memory that is associated with said separate pre-emption interrupt trigger.

Some of the above embodiments, as applicable, may be implemented using a variety of different information processing systems. For example, although FIG. 2 and the discussion thereof describe an exemplary SoC isolation control architecture, this exemplary architecture is presented merely to provide a useful reference in discussing various aspects of the invention. Description of the architecture has been simplified for purposes of discussion, and it is just one of many different types of appropriate architectures that may be used in accordance with the present disclosure. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Figure 7:
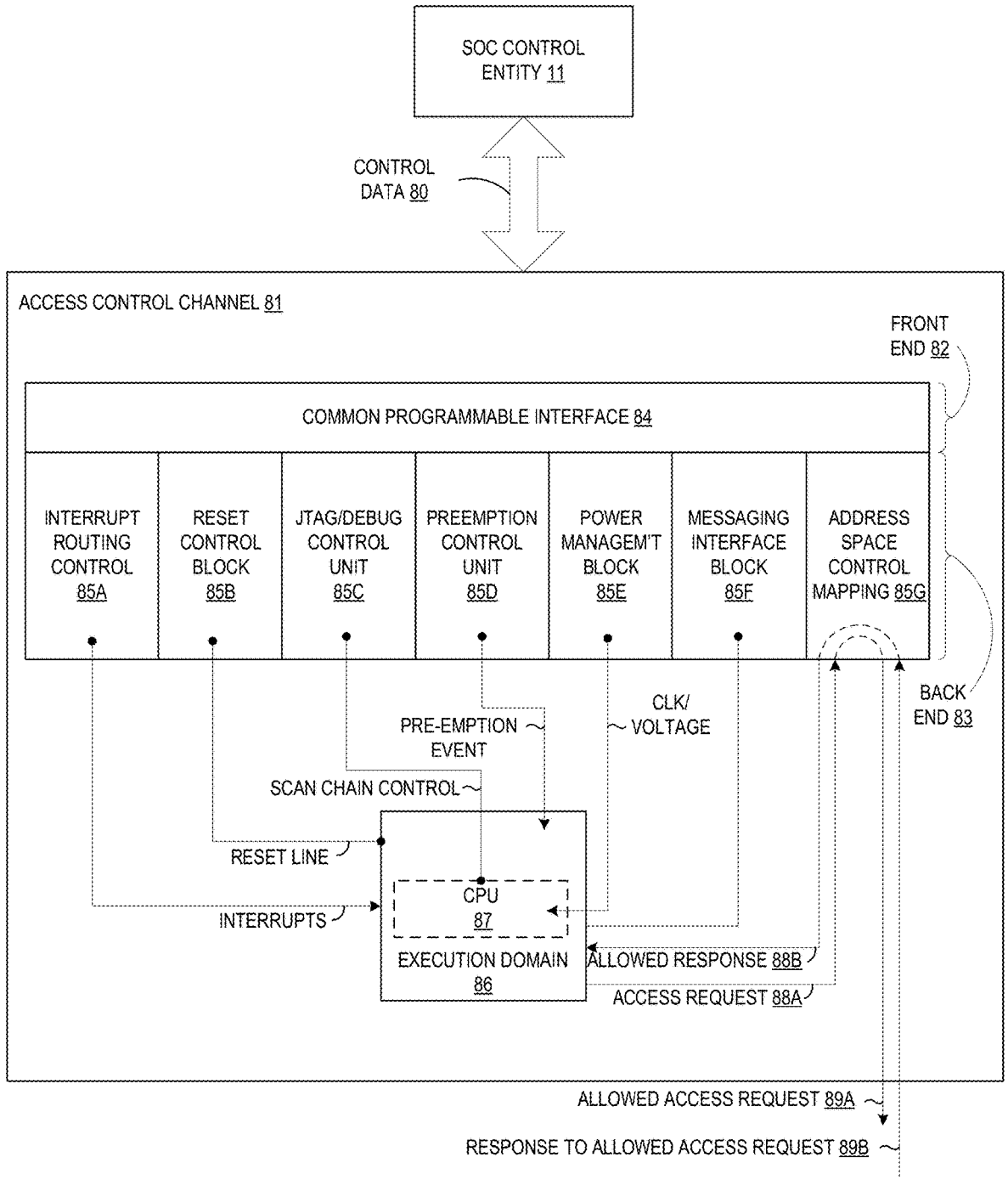
FIG. 7 is a simplified block diagram of an access control channel having a programmable front end and a signals-based back end that may be used by the SOC isolation control system to create a dynamic runtime isolation barrier in accordance with selected embodiments of the present disclosure.

In addition, the example SoC system embodiments illustrated in FIGS. 7-8 may be implemented with circuitry located on a single integrated circuit or within a same device. Alternatively, the SoC system embodiments may include any number of separate integrated circuits or separate devices interconnected with each other. For example, the main memory 107 may be located in whole or in part on the same integrated circuit as the SoC control CPU 101 or on a separate integrated circuit or located within another peripheral or slave discretely separate from other elements of SoC system 100. Peripherals 107 may also be located on separate integrated circuits or devices.

Furthermore, those skilled in the art will recognize that boundaries between the functionality of the above-described operations merely illustrative. The functionality of multiple operations may be combined into a single operation, or the functionality of a single operation may be distributed in additional operations. Moreover, alternative embodiments may include multiple instances of a particular operation, and the order of operations may be altered in various other embodiments.

All or some of the software described herein may be received from elements of the SoC system, such as, for example, from computer readable media such as memory 107 or other media on other computer systems. Such computer readable media may be permanently, removably or remotely coupled to an information processing system, such as the SoC system 100. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In selected embodiments, the SoC systems disclosed herein are part of a computer system such as an embedded microcontroller. Other embodiments may include different types of computer systems. Computer systems are information handling systems which can be designed to give independent computing power to one or more users. Computer systems may be found in many forms. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The term "coupled," as used herein, is not intended to be limited to a direct coupling or a mechanical coupling. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. And unless stated otherwise, terms such as "first" and "second" are used to arbitrarily distinguish between the elements such terms describe. Thus, these terms are not necessarily intended to indicate temporal or other prioritization of such elements.

Although the described exemplary embodiments disclosed herein are directed to various embodiments, the present invention is not necessarily limited to the example embodiments which illustrate inventive aspects of the present invention that are applicable to a wide variety of SoC systems and operational methodologies. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A multi-processor system-on-chip, comprising:
   an execution domain processor that is configured to run a first execution domain which hosts multiple independent software partitions by accessing, for each software partition, one or more system-on-chip resources;
   a first control point processor that is physically and programmatically independent from the execution domain processor and configured to generate a first runtime isolation control data stream for controlling access to the one or more system-on-chip resources by identifying at least a first system-on-chip resource that each software partition is allowed to access, where the first runtime isolation control data stream comprises one or more pre-emption interrupts, each comprising a set of pre-emption interrupt vector addresses and a set of corresponding pre-emption interrupt triggers which are set by the first control point processor;
   an access control circuit connected between the execution domain and the one or more system-on-chip resources and configured to provide a dynamic runtime isolation barrier in response to the first runtime isolation control data stream, where the dynamic runtime isolation barrier enables the execution domain processor to switch between the independent software partitions in response to each separate pre-emption interrupt trigger by fetching partition instructions from a corresponding pre-emption interrupt vector address in memory that is associated with said separate pre-emption interrupt trigger.

2. The multi-processor system-on-chip of claim 1, where the first control point processor is configured to install partition instructions at each pre-emption interrupt vector address in memory.

3. The multi-processor system-on-chip of claim 1, where the first control point processor is configured to run an isolation control program that is independent from any privileged software running on the execution domain processor.

4. The multi-processor system-on-chip of claim 1, where the one or more pre-emption interrupts are non-maskable by the execution domain processor.

5. The multi-processor system-on-chip of claim 1, where the first control point processor is configured to generate the one or more pre-emption interrupts so that the execution domain processor switches between the independent software partitions based on a partition priority model or a time-slice model.

6. The multi-processor system-on-chip of claim 1, where the first control point processor is configured to generate the one or more pre-emption interrupts so that the execution domain processor switches between the independent software partitions in response to a predetermined safety violation event, a predetermined security breach event, or a predetermined low-power state event.

7. The multi-processor system-on-chip of claim 1, where the access control circuit is configured to generate feedback data in response to any blocked access by the first execution domain, and where the first control point processor is configured to generate updated runtime isolation control data stream for controlling access to the one or more system-on-chip resources by the first execution domain in response to the feedback data.

8. The multi-processor system-on-chip of claim 1, where the runtime isolation control data stream generated by the first control point processor does not include a device identifier for the first control point processor.

9. The multi-processor system-on-chip of claim 1, where the first control point processor is configured to generate the first runtime isolation control data stream before the execution domain processor is released from reset to run the first execution domain.

10. The multi-processor system-on-chip of claim 1, where first runtime isolation control data stream comprises a runtime virtualization isolation control data stream which the first control point processor uses to configure the access control circuit to provide a dynamic runtime virtualization isolation barrier for controlling access to the one or more system-on-chip resources by the first execution domain by identifying at least a first system-on-chip resource that the first execution domain is allowed to access and mapping a virtual address for the first system-on-chip resource to a physical address for the first system-on-chip resource.

11. The multi-processor system-on-chip of claim 1, where the partition instructions stored in memory at each preemption interrupt vector address are executed by the execution domain processor to save a current context of a current partition executing on the execution domain processor before loading a saved context for a second partition to be executed on the execution domain processor.

12. A method for controlling operations of an execution domain on a multi-processor system-on-chip, comprising:
generating a runtime isolation control data stream by a control point processor for controlling access to one or more system-on-chip resources by an execution domain processor, where the runtime isolation control data stream comprises one or more pre-emption interrupts, each comprising a set of pre-emption interrupt vector addresses and a set of corresponding pre-emption interrupt triggers which are set by the control point processor;
generating, by an access control circuit connected between the execution domain processor and the one or more system-on-chip resources, a dynamic runtime isolation barrier in response to the runtime isolation control data stream to control access to the one or more system-on-chip resources by the execution domain processor that is physically and programmatically independent from the control point process, where the dynamic runtime isolation barrier enables the execution domain processor to switch between the independent software partitions in response to each separate pre-emption interrupt trigger by fetching partition instructions from a corresponding pre-emption interrupt vector address in memory that is associated with said separate pre-emption interrupt trigger; and
running a first execution domain on the execution domain processor which is configured to host multiple independent software partitions by accessing, for each software partition, one or more system-on-chip resources in compliance with the dynamic runtime isolation barrier.

13. The method of claim 12, where the control point processor is configured to install partition instructions at each pre-emption interrupt vector address in memory.

14. The method of claim 12, where the one or more pre-emption interrupts are non-maskable by the execution domain processor.

15. The method of claim 12, where generating the runtime isolation control data stream comprises generating, by the control point processor, the one or more pre-emption interrupts so that the execution domain processor switches between the independent software partitions based on a partition priority model or a time-slice model.

16. The method of claim 12, where generating the runtime isolation control data stream comprises generating, by the control point processor, the one or more pre-emption interrupts so that the execution domain processor switches between the independent software partitions in response to a predetermined safety violation event, a predetermined security breach event, or a predetermined low-power state event.

17. The method of claim 12, further comprising:
generating, by the access control circuit, feedback data in response to any blocked access by the execution domain processor; and
generating, by the control point processor, updated runtime isolation control data stream for controlling access to the one or more system-on-chip resources by the execution domain processor in response to the feedback data.

18. The method claim 12, where generating the runtime isolation control data stream comprises generating, by the control point processor, the runtime isolation control data stream before the execution domain processor is released from reset to run the first execution domain.

19. The method of claim 12, where the partition instructions stored in memory at each pre-emption interrupt vector address are executed by the execution domain processor to save a current context of a current partition executing on the execution domain processor before loading a saved context for a second partition to be executed on the execution domain processor.

20. A system-on-chip comprising:
an interconnect;
one or more system-on-chip resources connected to the interconnect;
a system-on-chip control point entity coupled to the interconnect and configured to generate a plurality of two-way runtime isolation control channel data streams, including at least a first two-way runtime isolation control data stream which comprises one or more pre-emption interrupts, each comprising a set of pre-emption interrupt vector addresses and a set of corresponding pre-emption interrupt triggers which are set by the system-on-chip control point entity;

a plurality of execution domains that are not directly connected to the interconnect and that include at least a first execution domain which is configured to host multiple independent software partitions by accessing, for each software partition, one or more system-on-chip resources in compliance with a dynamic runtime isolation barrier; and a plurality of access control channels attached, respectively, between the plurality of execution domains and the interconnect, where each access control channel that is attached to an execution domain is coupled to receive a corresponding two-way runtime isolation control channel data stream from the system-on-chip control point entity and is configured to define a corresponding dynamic runtime isolation barrier in response to the corresponding two-way runtime isolation control channel data stream, where the corresponding dynamic runtime isolation barrier enables the attached execution domain to switch between independent software partitions in response to each separate pre-emption interrupt trigger by fetching partition instructions from a corresponding pre-emption interrupt vector address in memory that is associated with said separate pre-emption interrupt trigger.

* * * * *